United States Patent
Kim et al.

(10) Patent No.: US 8,661,350 B2
(45) Date of Patent: Feb. 25, 2014

(54) MOBILE TERMINAL AND METHOD OF CONTROLLING OPERATION OF THE MOBILE TERMINAL

(75) Inventors: Tae Hun Kim, Seoul (KR); Dong Hyun Lee, Seoul (KR); Jin Won Lee, Seoul (KR); Sun Young Hwang, Seoul (KR); Sung Min Baek, Seoul (KR); Gung Hyun Nam, Seoul (KR); Jin Young Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 434 days.

(21) Appl. No.: 12/794,974

(22) Filed: Jun. 7, 2010

(65) Prior Publication Data

US 2011/0029891 A1 Feb. 3, 2011

(30) Foreign Application Priority Data

Jun. 16, 2009 (KR) ........................ 10-2009-0053530

(51) Int. Cl.
*G06F 3/00* (2006.01)
*G06F 3/048* (2013.01)

(52) U.S. Cl.
USPC ........... 715/744; 715/738; 715/745; 715/811; 715/835

(58) Field of Classification Search
USPC ......... 715/738, 744–747, 753, 811, 835, 863, 715/864, 821, 839
See application file for complete search history.

(56) References Cited

U.S. PATENT DOCUMENTS

| | | | |
|---|---|---|---|
| 6,000,000 A * | 12/1999 | Hawkins et al. | 707/610 |
| 6,243,091 B1 * | 6/2001 | Berstis | 715/839 |
| 6,785,708 B1 * | 8/2004 | Busey et al. | 709/204 |
| 6,958,981 B1 | 10/2005 | Hemminger | 370/270 |
| 6,976,094 B1 * | 12/2005 | Dalrymple et al. | 709/248 |
| 7,024,491 B1 * | 4/2006 | Hanmann et al. | 709/248 |
| 7,539,665 B2 * | 5/2009 | Mendez | 1/1 |
| 7,873,748 B2 * | 1/2011 | Cabezas et al. | 709/248 |
| 7,974,946 B2 * | 7/2011 | Meesseman | 707/621 |
| 8,010,901 B1 * | 8/2011 | Rogers | 715/751 |
| 8,169,410 B2 * | 5/2012 | Hashimoto et al. | 345/173 |

(Continued)

FOREIGN PATENT DOCUMENTS

| | | |
|---|---|---|
| CN | 1404676 | 3/2003 |
| CN | 1570904 | 1/2005 |

(Continued)

OTHER PUBLICATIONS

Jochems, "Entering URLs on Mobile Phones", 7th Twente Student Conference on IT, Enschede, Netherlands Jun. 25, 2007, copyright 2007 University of Twente, Faculty of Electrical Engineering, Mathematics and Computer Science.*

(Continued)

*Primary Examiner* — Omar Abdul-Ali
*Assistant Examiner* — Andrew Tank
(74) *Attorney, Agent, or Firm* — KED & Associates LLP

(57) ABSTRACT

A mobile terminal and an operating method of the mobile terminal are provided. The mobile terminal may be coupled, either wirelessly or by wire, to an external terminal and the mobile terminal may thus receive sync data including information regarding a webpage currently being displayed by the external terminal from the external terminal or a server. The mobile terminal may display the same webpage as is currently being displayed by the external terminal based on the received sync data.

25 Claims, 15 Drawing Sheets

(56) References Cited

U.S. PATENT DOCUMENTS

| | | |
|---|---|---|
| 8,239,773 B1 * | 8/2012 | Billman .................. 715/751 |
| 2007/0118577 A1 * | 5/2007 | East ....................... 707/204 |
| 2009/0178006 A1 * | 7/2009 | Lemay et al. .......... 715/835 |
| 2010/0162168 A1 * | 6/2010 | Lee et al. ............... 715/821 |

FOREIGN PATENT DOCUMENTS

| | | |
|---|---|---|
| CN | 1867012 | 11/2006 |
| CN | 101123590 | 2/2008 |
| EP | 1 213 896 | 6/2002 |

OTHER PUBLICATIONS

European Search Report for Application 10006097.9 dated Nov. 11, 2010.

Chinese Office Action dated Aug. 17, 2012 for Application 201010205864.9.

* cited by examiner (a)  (b)

(a)  (b)

(a)  (b)

(a)  (b)

(a)　　　　　　　　　　(b)

(a)    (b)

MOBILE TERMINAL AND METHOD OF CONTROLLING OPERATION OF THE MOBILE TERMINAL

This application claims priority and benefit from Korean Patent Application No. 10-2009-0053530, filed Jun. 16, 2009, the subject matter of which is incorporated herein by reference.

BACKGROUND

1. Field

Embodiments of the present invention may relate to a mobile terminal, an operating method of the mobile terminal and a terminal sync system for the mobile terminal. More particularly, embodiments of the present invention may relate to a mobile terminal that can be synchronized with an external terminal and can thus display a webpage or a messenger displayed by the external terminal, an operating method of the mobile terminal and a terminal sync system for the mobile terminal.

2. Background

Mobile terminals are portable devices that can provide users with various services such as a voice calling service, a video calling service, an information input/output service, and/or a data storage service.

Mobile terminals may be equipped with various complicated functions such as capturing photos or moving pictures, playing music files or moving image files, providing game programs, receiving broadcast programs and providing wireless internet services and have thus evolved into multimedia players.

Attempts have been made to realize such complicated functions as hardware devices and/or software programs. For example, various user interface (UI) environments have been developed in which users are allowed to easily search for and choose desired functions. A demand for various designs for mobile terminals such as a double-sided liquid crystal display (LCD) or a full touch screen has steadily grown due to a growing tendency of considering mobile terminals as personal items that can represent personal individuality.

However, there may be restrictions in allocating sufficient space for a UI (such as a display device or a keypad) of a mobile terminal without compromising mobility and portability of the mobile terminal. The size of mobile terminals may be insufficient to properly perform data input and output functions even if they are equipped with full-touch screens.

BRIEF DESCRIPTION OF THE DRAWINGS

Arrangements and embodiments may be described in detail with reference to the following drawings in which like reference numerals refer to like elements and wherein.

DETAILED DESCRIPTION

Embodiments of the present invention may hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP) and/or a navigation device, for example.

Figure 1:
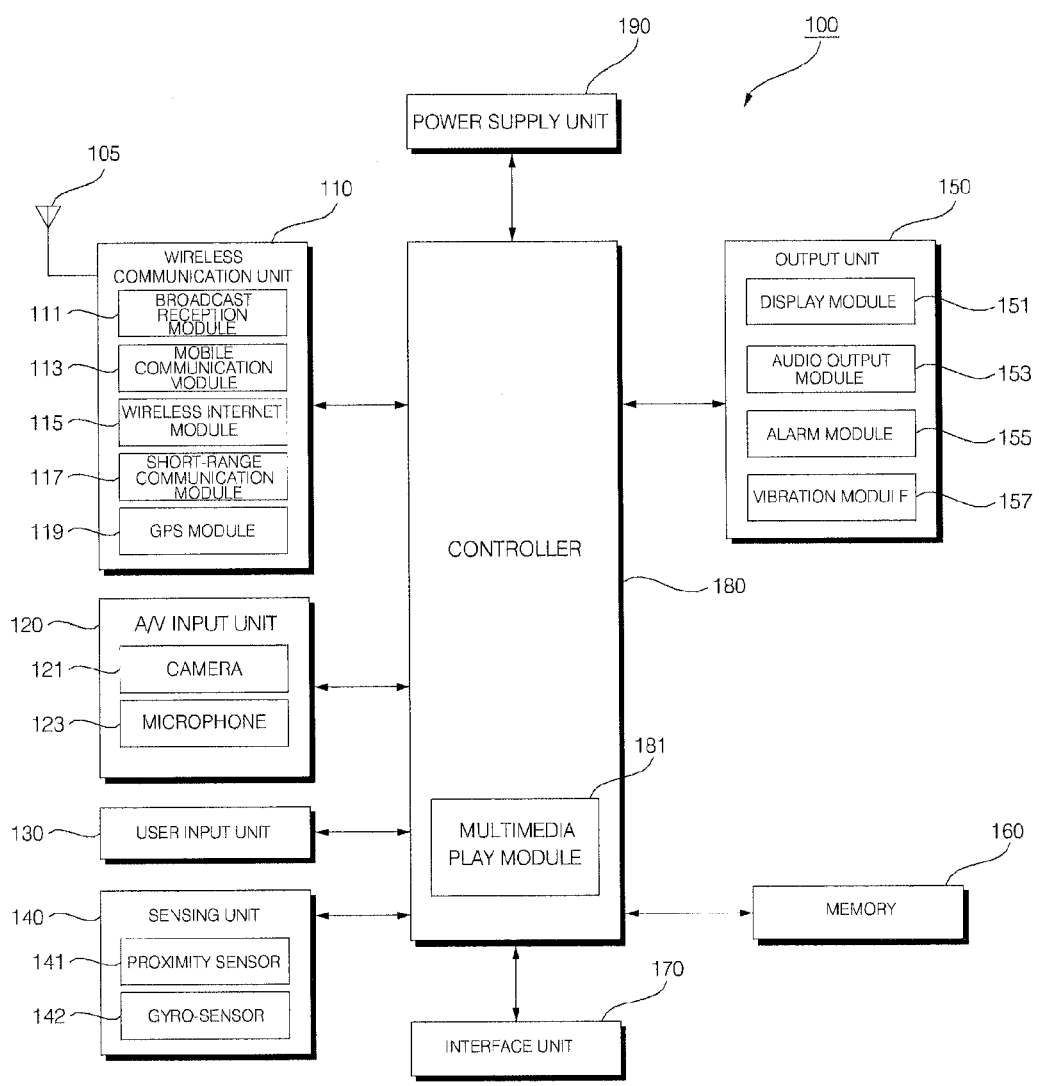
FIG. 1 illustrates a block diagram of a mobile terminal according to an exemplary embodiment.

FIG. 1 illustrates a block diagram of a mobile terminal according to an example embodiment. Other embodiments and configurations may also be within the scope of embodiments of the present invention.

As shown in FIG. 1, a mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units. For example, the A/V input unit 120 or the sensing unit 140 may be incorporated into the user input unit 130.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server that generates broadcast signals and/or broadcast-related information and transmits the generated broadcast signals and/or the generated broadcast-related information, or the broadcast management server may be a server that receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, a combination of a data broadcast signal and a TV broadcast signal or a combination of a data broadcast signal and a radio broadcast signal. The broadcast-related information may be provided to the mobile terminal 100 through a mobile communication network. The broadcast-related information may be received by the mobile communication module 113, rather than by the broadcast reception module 111. The broadcast-related information may come in various forms. For example, the broadcast-related information may be an electronic program guide (EPG) of digital multimedia broadcasting (DMB) or may be an electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). The broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receive wireless signals from at least one of a base station, an external terminal, and a server through a mobile communication network. The wireless signals may include various types of data according to whether the mobile terminal 100 transmits/receives voice call signals, video call signals and/or text/multimedia messages.

The wireless internet module 115 may be a module for wirelessly accessing the internet. The wireless internet module 115 may be embedded in the mobile terminal 100 or may be installed in an external device that may be connected to the mobile terminal 100 while accessing the internet.

The short-range communication module 117 may be a module for short-range communication. The short-range communication module 117 may use various short-range communication techniques such as Bluetooth, radio frequency identification (RFID), infrared data association (IrDA), ultra wideband (UWB) and/or ZigBee, for example.

The GPS module 119 may receive position information from a plurality of GPS satellites.

The A/V input unit 120 may receive audio signals and/or video signals. The A/V input unit 120 may include a camera 121 and a microphone 123. The camera 121 may process various image frames such as still images or moving images captured by an image sensor during a video call mode and/or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode and/or a voice recognition mode and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove (or reduce) noise that may be generated during reception of external sound signals.

The user input unit 130 may generate key input data based on user input for controlling the operation of the mobile terminal 100. The user input unit 130 may be implemented as a keypad, a dome switch, a touch pad (static pressure/static voltage), a jog wheel and/or a jog switch. In particular, if the user input unit 130 is implemented as a touch pad and forms a layer structure together with the display module 151, the user input unit 130 and the display module 151 may be collectively referred to as a touch screen.

The sensing unit 140 may determine a current state of the mobile terminal 100 such as whether the mobile terminal 100 is opened or closed, a position of the mobile terminal 100 and whether the mobile terminal 100 is placed in contact with a user, and the sensing unit may generate a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a proximity sensor 141. The proximity sensor 141 may determine whether there is an object (or entity) nearby and approaching the mobile terminal 100 without any mechanical contact with the object. More specifically, the proximity sensor 141 may detect an object that is nearby and approaching by detecting a change in an alternating magnetic field or a rate of change of static capacitance. The sensing unit 140 may include two or more proximity sensors 141.

The sensing unit 140 may also include a gyro-sensor 142 that senses motion of an object by using a gyroscope. Examples of the gyro-sensor 142 may include an inertial sensor and an acceleration sensor. A gyroscope may be classified as a mechanical gyroscope, a ring laser gyroscope, or an optic fiber gyroscope. The gyro-sensor 142 may sense motion of the mobile terminal 100 and may thus provide a signal for controlling the mobile terminal 100.

The output unit 150 may output audio signals, video signals and/or alarm signals. The output unit 150 may include the display module 151, an audio output module 153, an alarm module 155, and a vibration module 157.

The display module 151 may display various information processed by the mobile terminal 100. For example, if the mobile terminal 100 is in a call mode, the display module 151 may display a user interface (UI) and/or a graphic user interface (GUI) for making or receiving a call. If the mobile terminal 100 is in a video call mode or in an image capturing mode, the display module 151 may display a UI or a GUI for capturing or receiving images.

If the display module 151 and the user input unit 130 together form a layer structure and are thus implemented as a touch screen, the display module 151 may be used as both an output device and an input device. If the display module 151 is implemented as a touch screen, the display module 151 may also include a touch screen panel and a touch screen panel controller. The touch screen panel may be a transparent panel attached to an exterior of the mobile terminal 100 and may be connected to an internal bus of the mobile terminal 100. The touch screen panel may keep monitoring whether the touch screen panel is being touched by the user. Once a touch input to the touch screen panel is detected, the touch screen panel may transmit a number of signals corresponding to the touch input to the touch screen panel controller. The touch screen panel controller may process the signals transmitted by the touch screen panel, and may transmit the processed signals to the controller 180. Then, the controller 180 may determine whether a touch input has been generated and which part of the touch screen panel has been touched based on the processed signals transmitted by the touch screen panel controller.

The display module 151 may include at least one of a liquid crystal display (LCD), a thin film transistor (TFT)-LCD, an organic light-emitting diode (OLED), a flexible display, a transparent display or a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode and/or a broadcast reception mode or the audio output module 153 may output audio data present in the memory 160. Additionally, the audio output module 153 may output various sound signals associated with functions of the mobile terminal 100 such as receiving a call or a message. The audio output module 153 may include a speaker and a buzzer.

The alarm module 155 may output an alarm signal indicating an occurrence of an event in the mobile terminal 100. Examples of the event may include receiving a call signal, receiving a message, and receiving a key signal. Examples of the alarm signal output by the alarm module 155 may include an audio signal, a video signal and a vibration signal. More specifically, the alarm module 155 may output an alarm signal upon receiving a call signal or a message. Additionally, the alarm module 155 may receive a key signal and may output an alarm signal as feedback to the key signal. Therefore, the user may easily recognize an occurrence of an event based on an alarm signal output by the alarm module 155. An alarm signal for notifying the user of the occurrence of an event may be output not only by the alarm module 155 but also by the display module 151 or by the audio output module 153.

The vibration module 157 may generate various types of vibration effects with various intensities in response to a vibration signal provided by the controller 180. The intensity, pattern, frequency, moving direction and/or moving speed of a vibration effect generated by the vibration module 157 may be determined by the vibration signal. The mobile terminal 100 may include two or more vibration modules 157.

The memory 160 may store various programs necessary for operation of the controller 180. Additionally, the memory 160 may temporarily store various data such as a phonebook, messages, still images and/or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM) and/or a read-only memory (ROM). The mobile terminal 100 may operate a web storage that performs functions of the memory 160 on the internet.

The interface unit 170 may interface with an external device that can be connected to the mobile terminal 100. The interface unit 170 may be a wired/wireless headset, an external battery charger, a wired/wireless data port, a card socket (for, e.g., a memory card, a subscriber identification module (SIM) card or a user identity module (UIM) card), an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

The controller 180 may control a general operation of the mobile terminal 100. For example, the controller 180 may perform various control operations regarding making/receiving a voice call, transmitting/receiving data and/or making/receiving a video call. The controller 180 may include a multimedia play module 181 that plays multimedia data. The multimedia play module 181 may be implemented as a hardware device and may be installed in the controller 180. Alternatively, the multimedia play module 181 may be implemented as a software program.

The power supply unit 190 may be supplied with power by an external power source or an internal power source and may supply power to other components in the mobile terminal 100.

The exterior of the mobile terminal 100 may hereinafter be described in detail with reference to FIGS. 2 and 3. For convenience, elements of the mobile terminal 100 may be described with respect to a bar-type mobile terminal equipped with a full-touch screen. However, embodiments of the present invention are not limited to a bar-type mobile terminal. Rather, embodiments of the present invention may be applied to mobile phones other than a bar-type mobile terminal.

Figure 2:
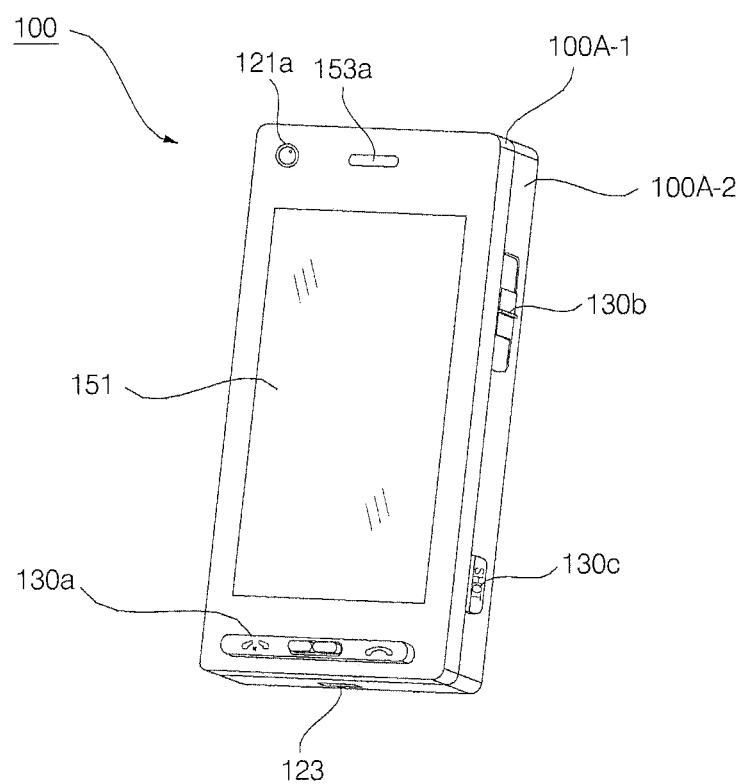
FIG. 2 illustrates a front perspective view of the mobile terminal shown in FIG. 1.

FIG. 2 illustrates a front perspective view of the mobile terminal 100 shown in FIG. 1. As shown in FIG. 2, the exterior of the first body 100A may be defined by a front case 100A-1 and a rear case 100A-2. Various electronic devices may be installed in space formed by the front case 100A-1 and the rear case 100A-2. At least one intermediate case may be additionally provided between the front case 100A-1 and the rear case 100A-2. The front case 100A-1 and the rear case 100A-2 may be formed of a synthetic resin through injection molding. The front case 100A-1 and the rear case 100A-2 may also be formed of a metal such as stainless steel (STS) or titanium (Ti).

The display module 151, a first audio output module 153a, a first camera 121a and a first user input unit 130a may be disposed in (or provided on) the front case 100A-1. A second user input unit 130b, a third user input unit 130c and the microphone 123 may be disposed on (or provided on) one side of the rear case 100A-2.

Examples of the display module 151 may include an LCD and an OLED that can visualize information. Since a touch pad is configured to overlap the display module 151 and thus form a layered structure, the display module 151 may serve as a touch screen. Thus, the user may input various information to the mobile terminal 100 by simply touching the display module 151.

The first audio output module 153a may be implemented as a receiver or a speaker. The first camera 121a may capture a still image or a moving image of the user. The microphone 123 may properly receive the user's voice or other sounds.

The first through third user input units 130a through 130c may be collectively referred to as the user input unit 130. The user input unit 130 may adopt various manipulation methods as long as it may offer tactile feedback to the user.

For example, the user input unit 130 may be implemented as a dome switch or a touch pad that receives a command or information upon being pushed or touched by the user. Alternatively, the user input unit 130 may be implemented as a wheel, a jog dial, or a joystick.

The first user input unit 130a may allow the user to input commands (such as 'start', 'end', and 'send'), the second user input unit 130b may be used to switch from one operating mode to another, and the third user input unit 130c may be used as a hot key for activating certain functions of the mobile terminal 100.

When the user's finger approaches the display module 151, the proximity sensor 141 may detect the user's finger and may output a proximity signal. The proximity signal output by the proximity sensor 141 may vary according to distance between the display module 151 and the user's finger. The mobile terminal 100 may include more than one proximity sensor 141 each having a different sensing range. In this case, the distance between the display module 151 and the user's finger may be determined by comparing a plurality of proximity signals respectively provided by the proximity sensors 141. In addition, a part of the display unit 151 being approached by the user's finger and whether the user's finger is moving within a close range of the display unit 151 may be determined by determining which of the proximity sensors 141 outputs a proximity signal. The controller 180 may choose a touch key corresponding to part of the display unit 151 approached by the user's finger and thus control the vibration module 157 to output a vibration signal corresponding to the chosen touch key.

If the user tilts or shakes the mobile terminal 100, the gyro-sensor 142 may detect motion of the mobile terminal 100. Thereafter, the gyro-sensor 142 may generate a signal corresponding to movement of the mobile terminal 100 and may output the signal to the controller 180. The controller 180 may acquire various information regarding movement of the mobile terminal 100 such as direction, angle, velocity, and/or magnitude of the movement of the mobile terminal 100 and a current location of the mobile terminal 100 from the signal generated by the gyro-sensor 142.

The controller 180 may keep track of the movement of the mobile terminal 100 based on information acquired from the signal generated by the gyro-sensor 142. The type of information that can be acquired from the signal generated by the gyro-sensor 142 may vary according to a type of the gyro-sensor 142. Thus, a gyro-sensor 142 capable of providing desired information may be included in the mobile terminal 100. The mobile terminal 100 may include at least one gyro-sensor 142. The controller 180 may control the gyro-sensor 142 to be driven only when a certain application is executed.

Figure 3:
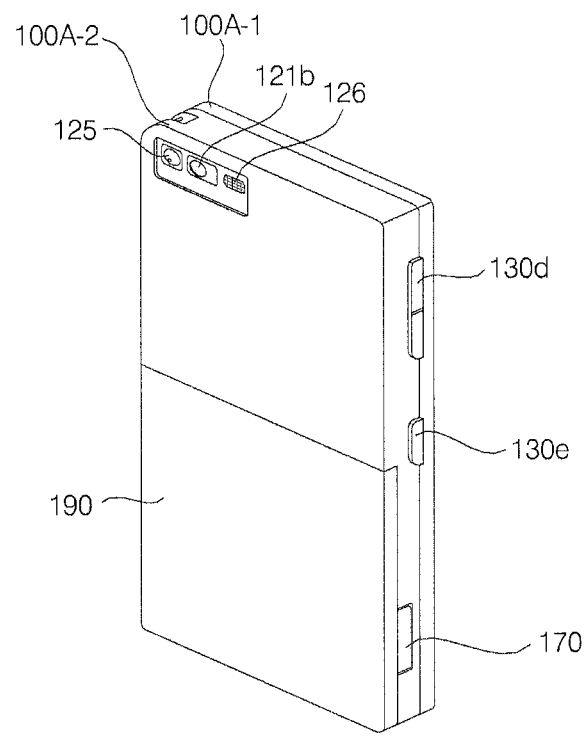
FIG. 3 illustrates a rear perspective view of the mobile terminal shown in FIG. 1.

FIG. 3 illustrates a rear perspective view of the mobile terminal 100 shown in FIG. 2. As shown in FIG. 3, a fourth user input unit 130d, a fifth user input unit 130e and the interface unit 170 may be disposed (or provided) on one side of the rear case 100A-2, and a second camera 121b may be disposed at (or provided on) the rear of the rear case 100A-2.

The second camera 121b may have a different photographing direction from the first camera 121a shown in FIG. 2. The first and second cameras 121a and 121b may have different resolutions. For example, the first camera 121a may capture and then transmit an image of the face of the user during a video call. Thus, a low-resolution camera may be used as the first camera 121a. The second camera 121b may capture an image of an ordinary subject. The image captured by the second camera 121b may not need to be transmitted. Thus, a high-resolution camera may be used as the second camera 121b.

A mirror 125 and a camera flash 126 may be provided near the second camera 121b. The mirror 125 may be used by a user to prepare himself or herself for taking a self shot. The camera flash 126 may illuminate a subject when the user attempts to capture an image of the subject with the second camera 121b.

A second audio output module (not shown) may be additionally provided in the rear case 100A-2. The second audio output module may realize a stereo function along with the first audio output module 153a. The second audio output module may also be used during a speaker-phone mode.

An antenna (not shown) for receiving a broadcast signal may be provided on one side of the rear case 100A-2. The antenna may be installed so as to be able to be pulled out of the rear case 100A-2.

The interface unit 170 may serve as a path for allowing the mobile terminal 100 to exchange data with an external device (such as an external terminal). For example, the interface unit 170 may be a connector for connecting an earphone to the mobile terminal 100 either wirelessly or by wire, a port for short-range communication or a power supply port for supplying power to the mobile terminal 100. The interface unit 170 may be a card socket for accommodating an exterior card such as a SIM or UIM card and/or a memory card.

The second camera 121b and the other elements that have been described as being provided on the rear case 100A-2 may also be provided on the front case 100A-1.

The first camera 121a may be rotatable and thus cover the photographing direction of the second camera 121b. The second camera 121b may then be optional.

The power supply unit 190 may be disposed in (or provided on) the rear case 100A-2. The power supply unit 190 may be a rechargeable battery and may be coupled to the rear case 100A-2 so as to be attachable to or detachable from the rear case 100A-2.

Figure 4:
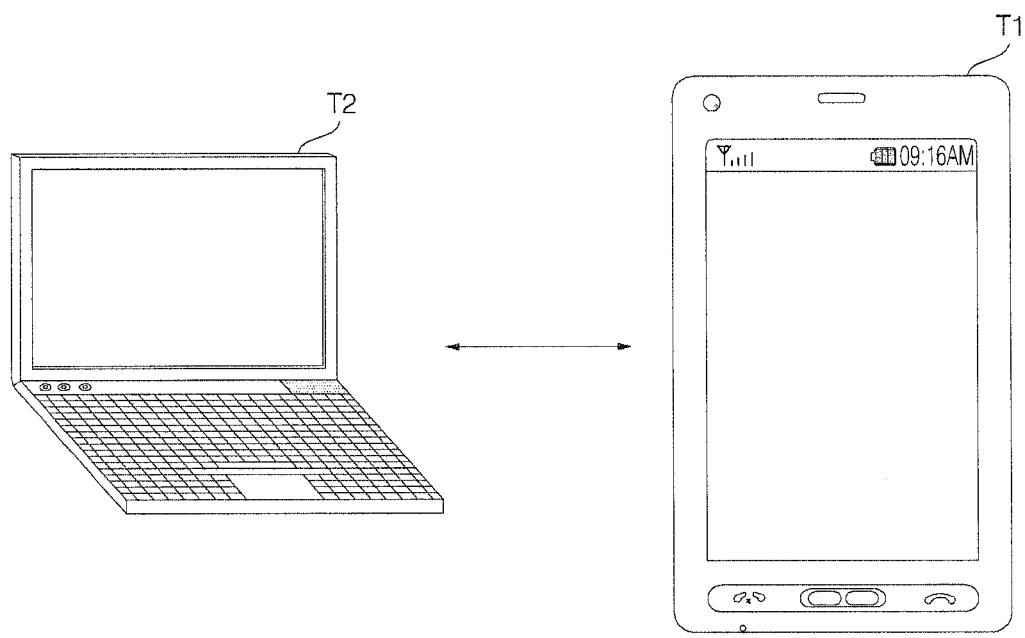
FIG. 4 illustrates a mobile terminal being synchronized with an external terminal.

FIG. 4 illustrates a mobile terminal being synchronized with an external terminal T2. The terminal T2 may be connected to the mobile terminal T1, either wirelessly or by wire. The mobile terminal T1 may correspond to the mobile terminal 100. As shown in FIG. 4, the mobile terminal T1 may be synchronized with the external terminal T2 that is capable of displaying a webpage or a messenger, for example. More specifically, a webpage or a messenger may be displayed on a screen of the external terminal T2 using a web browser or a messenger browser. The mobile terminal T1 may receive data relating to the webpage or the messenger being currently displayed by the external terminal T2, webpage history information, text data input to the webpage or the messenger being currently displayed by the external terminal T2 or text data displayed on the messenger being currently displayed by the external terminal T2. The mobile terminal T1 may display a webpage or a messenger included in the received data on a display module 151.

For example, the user may transmit the webpage or the messenger currently being displayed by the external terminal T2 to the mobile terminal 100. The webpage or the messenger currently being displayed by the external terminal T2 may then be displayed on the display module 151. As a result, the user may view a same content item not only from the external terminal T2 but also from the mobile terminal T1. The term 'content item' as used herein may indicate text, a still image, a moving image and/or audio data displayed or output in association with a webpage or a messenger.

If a command to transmit sync data is input to the external terminal T2, the external terminal T2 may transmit sync data to the mobile terminal T1. The sync data provided by the external terminal T2 may include information regarding a screen currently being displayed by the external terminal T2 such as a webpage, a messenger, an email and/or a word-processor document (or word-processor screen) being currently displayed by the external terminal T2. The mobile terminal T1 may display the same screen as is being currently displayed by the external terminal T2 based on the sync data provided by the external terminal T2. As a result, the user may view a same screen not only from the external terminal T2 but also from the mobile terminal 100.

The sync data provided by the external terminal T2 may include data regarding a webpage displayed by the external terminal T2. For example, the external terminal T2 may transmit sync data to the mobile terminal T1 including webpage history information that specifies a history of a number of webpages that have been displayed by the external terminal T2. The mobile terminal 100 may extract the webpage history information included in the sync data provided by the external terminal T2 and may display the extracted webpage history information as a text list or using one or more tabs. As a result, the user may easily identify history of the webpages that have been displayed by the external terminal T2. If one of the webpages that have been displayed by the external terminal T2 is selected, the mobile terminal T1 may access the selected webpage and thus display a webpage corresponding to the selected webpage.

Additionally, the external terminal T2 may transmit sync data to the mobile terminal T1. The transmitted sync data may include text information regarding a plurality of text strings that have been input to a webpage or a messenger that has been or is currently being displayed by the external terminal T2. The transmitted sync data may also include information regarding a UI set in a screen that has been or is currently being loaded in the external terminal T2. As a result, the user may view the same webpage or the same messenger not only from the external terminal T2 but also from the mobile terminal 100 and the user may engage in a same chat session not only via the external terminal T2 but also via the mobile terminal T1.

If the external terminal T2 displays an email screen, the user may check email through the email screen and may then write an email. The user may issue a command to transmit sync data to the external terminal T2 while writing the email. The external terminal T2 may then transmit sync data to the mobile terminal T1 including email screen information that includes information regarding the email. The mobile terminal T1 may display the same email screen as is being currently displayed by the external terminal T2 with reference to the sync data provided by the external terminal T2, and the mobile terminal T1 may display an email in the email browser displayed on the display module 151, thereby allowing the user to complete writing of the email using the mobile terminal T1.

Further, if the user inputs a command to transmit sync data to the external terminal T2 while creating a document using the external terminal T2, the external terminal T2 may transmit sync data including information regarding the document to the mobile terminal T1. The mobile terminal T1 may then display a browser for creating documents, and the mobile terminal T1 may display the same document page as is being currently displayed by the external terminal T2, thereby enabling the user to continue to complete creation of the document.

The mobile terminal T1 and the external terminal T2 may be coupled to each other via a universal serial bus (USB) and/or using various wireless communication standards such as Bluetooth, IR and WiFi, for example.

A web server (not shown) that synchronizes the mobile terminal T1 and the external terminal T2 with each other may be provided between the mobile terminal T1 and the external terminal T2. The web server may be coupled to the mobile terminal T1 and the external terminal T2 via the internet. The web server may forward sync data transmitted to the mobile terminal T1 by the external terminal T2 to the mobile terminal T1.

The external terminal T2 may be a personal computer (PC), although embodiments are not limited to this. That is, various types of terminals other than a PC may be used as the external terminal T2 as long as they can display a webpage or a messenger.

Figure 5:
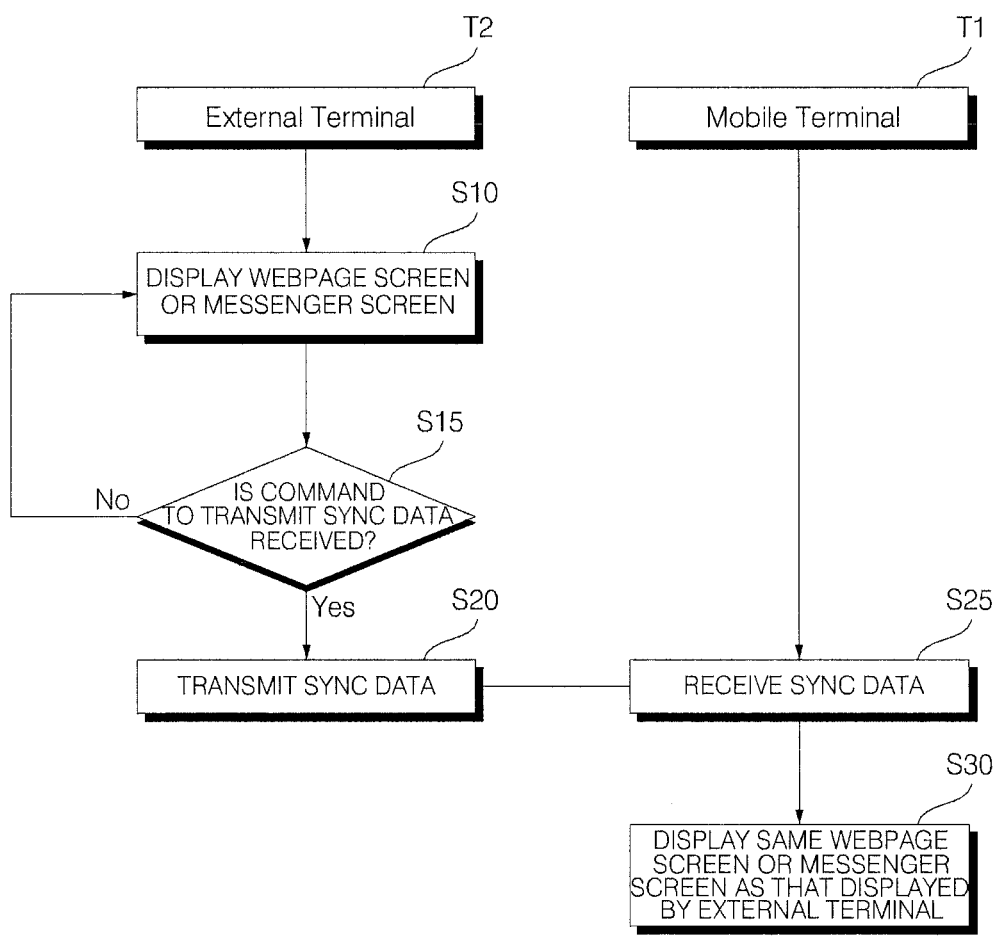
FIGS. 5 through 8 illustrate flowcharts of operating methods of a mobile terminal according to exemplary embodiments of the present invention.

FIG. 5 illustrates a flowchart of an operating method of a mobile terminal according to an exemplary embodiment of the present invention. Other operations, orders of operations and embodiments may also be within the scope of the present invention. As shown in FIG. 5, the external terminal T2 may access a webpage and thus display a webpage on its display module and/or may load a messenger program and thus display a messenger on its display module (S10). If the external terminal T2 accesses at least two webpages, information regarding the accessed webpages may be saved. Information regarding the accessed webpages may be referred to as webpage history information. The webpage history information may include either addresses of webpages displayed during a predetermined period of time or addresses of webpages displayed as webpage information on each date.

A determination may be made whether a user inputs a command to transmit sync data to the external terminal T2 (S15). The external terminal T2 may then transmit, in operation S20, sync data to the mobile terminal T1 including at least one of the webpage or the messenger being currently displayed by the external terminal T2, the webpage history information, text data input to the webpage or the messenger that has been or is being currently displayed by the external terminal T2, and text data displayed on the webpage or the messenger being currently displayed by the external terminal T2.

The external terminal T2 may transmit the sync data to the mobile terminal T1 via a USB and/or using various wireless communication methods. Alternatively, the external terminal T2 may transmit the sync data to the mobile terminal T1 via a web server.

The mobile terminal T1 may receive the sync data transmitted by the external terminal T2 (S25), and the mobile terminal T1 may display the received sync data (S30). More specifically, the mobile terminal T1 may extract data regarding the webpage or the messenger being currently displayed by the external terminal T2 from the received sync data. Thereafter, the mobile terminal T1 may display the same webpage or the same messenger as that being currently displayed by the external terminal T2 based on the extracted data.

In this embodiment, the mobile terminal T1 may extract the webpage included in the received sync data and may display the extracted webpage. Alternatively, the mobile terminal T1 may extract a webpage selected by the user from the received sync data and may display the extracted webpage. The user may be allowed to choose in advance what to display on the display module 151.

Alternatively, the mobile terminal T1 may extract the messenger included in the received sync data and may display the extracted messenger along with at least one of text data, a still image, a moving image and audio data displayed or output in association with the extracted messenger. As a result, the user may participate in a same chat session not only via the external terminal T2 but also via the mobile terminal T1.

Figure 6:
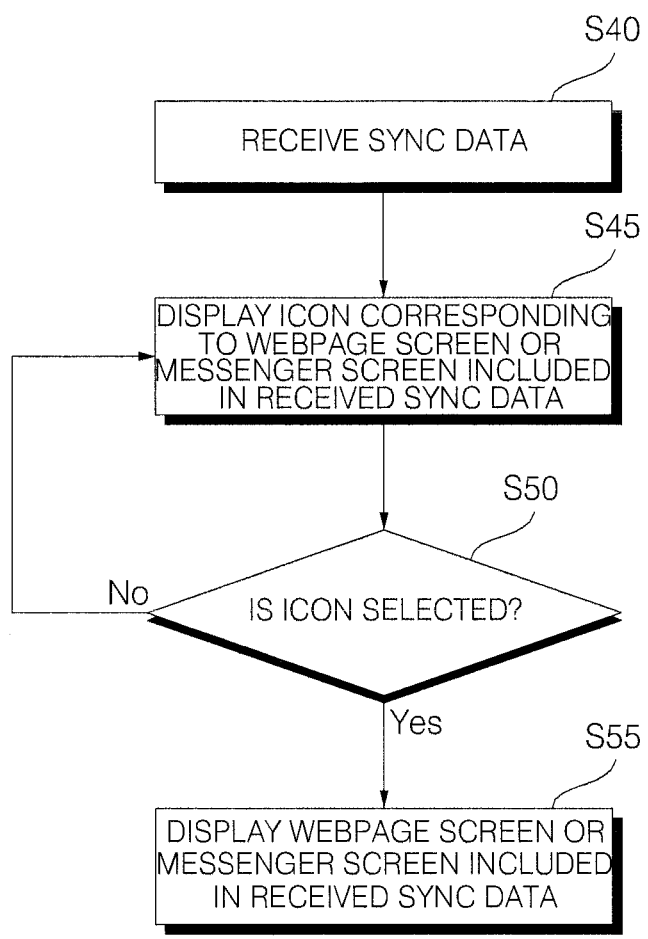

FIG. 6 illustrates a flowchart of an operating method of a mobile terminal according to an exemplary embodiment of the present invention. Other operations, orders of operations and embodiments may also be within the scope of the present invention. As shown in FIG. 6, the mobile terminal T1 may display an icon corresponding to a webpage or a messenger included in sync data provided by the external terminal T2. More specifically, if the icon corresponding to the webpage or the messenger included in the sync data provided by the external terminal T2 is selected, the controller 180 may display the webpage or the messenger included in the sync data provided by the external terminal T2 on the display module 151.

The icon corresponding to the webpage or the messenger included in the sync data provided by the external terminal T2 may be set to automatically disappear from the display module 151 as soon as the webpage or the messenger included in the sync data provided by the external terminal T2 is displayed on the display module 151.

As shown in FIG. 6, the mobile terminal T1 may receive sync data provided by the external terminal T2 (S40), and the mobile terminal T1 may display an icon corresponding to a webpage or a messenger included in the received sync data (S45). The icon corresponding to the webpage or the messenger included in the received sync data may include an image included in the webpage or the messenger provided in the received sync data, an image representing a browser corresponding to the webpage or the messenger provided in the received sync data and/or an image selected by the user. The controller 180 may display on-screen display (OSD) data and/or a widget on the display module 151 rather than the icon corresponding to the webpage or the messenger provided in the received sync data.

The controller 180 may display the icon corresponding to the webpage or the messenger included in the received sync data on an idle screen. The webpage included in the received sync data may be a webpage displayed by the external terminal T2 at a transmission time of sync data or a webpage selected by the user.

Thereafter, the controller 180 may determine whether the icon displayed on the display module 151 in operation S45 has been selected (S50). If it is determined that the icon displayed on the display module 151 in operation S45 has been selected, the controller 180 may display the webpage or the messenger included in the received sync data on the display module 151 (S55).

More specifically, the controller 180 may extract the webpage included in the received sync data and may display the extracted webpage on the display module 151. However, embodiments of the present invention are not limited to this example. That is, the controller 180 may access one of a number of webpages listed in webpage history information included in the received sync data via the internet and may display the accessed webpage on the display module 151.

The controller 180 may display the messenger included in the received sync data on the display module 151 along with at least one of text data, a still image and a moving image displayed on the messenger displayed on the external terminal T2. Alternatively, if the messenger displayed on the external terminal T2 includes audio data, the controller 180 may output the audio data when displaying the messenger included in the received sync data. The controller 180 may delete the icon corresponding to the webpage or the messenger included in the received sync data from the idle screen as soon as the webpage or the messenger included in the received sync data is displayed on the display module 151.

Figure 7:
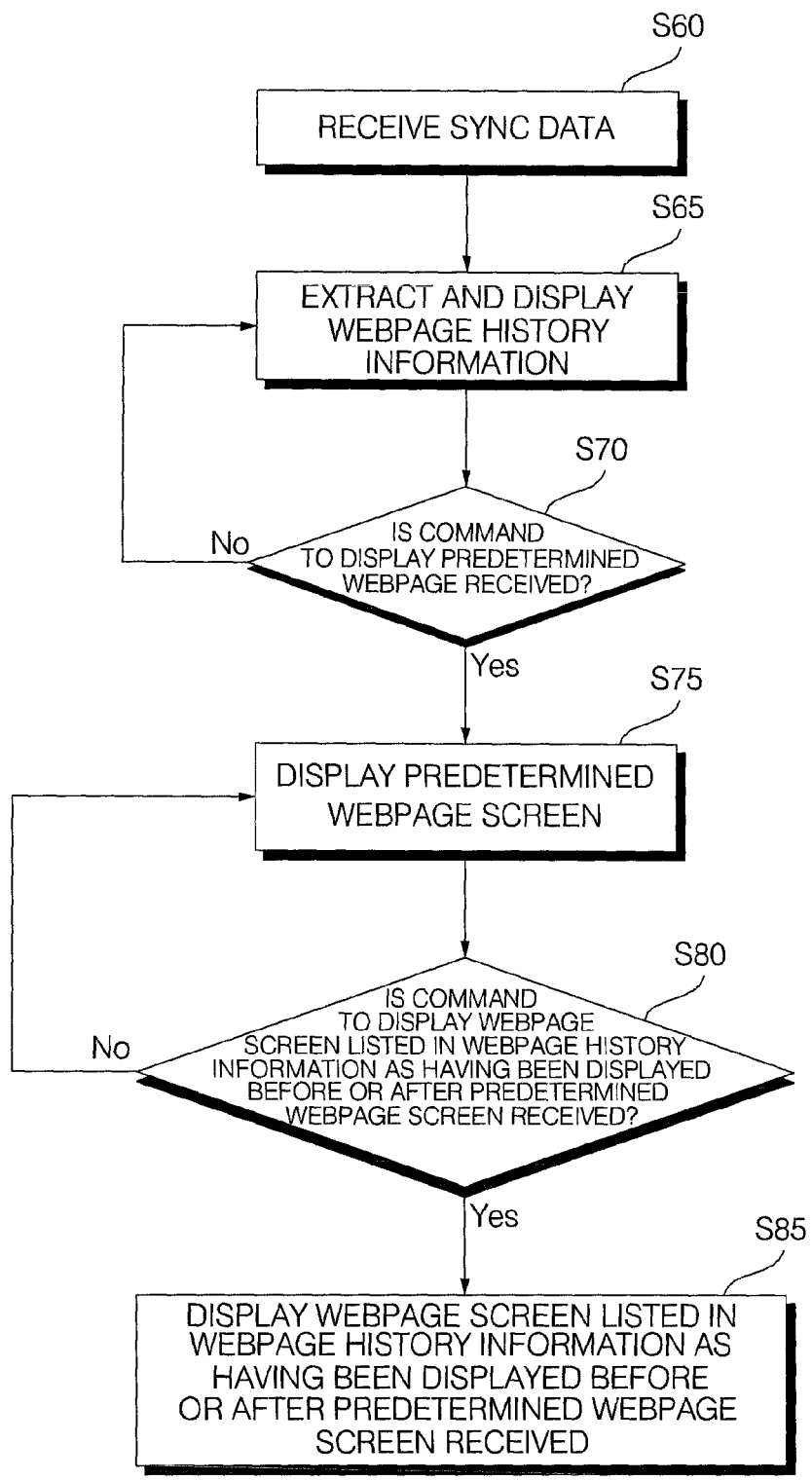

FIG. 7 illustrates a flowchart of an operating method of a mobile terminal according to an exemplary embodiment of the present invention. Other operations, orders of operations and embodiments may also be within the scope of the present invention. As shown in FIG. 7, the mobile terminal T1 may extract webpage history information from sync data provided by the external terminal T2 and may display the extracted webpage history information as a text list or using one or more tabs. Thus, the user may identify a list of webpages that have been displayed by the external terminal T2 from the webpage history information displayed on the display module 151, and the user may access any one of the webpages listed in the webpage history information.

The mobile terminal T1 may receive sync data provided by the external terminal T2 (S60). The mobile terminal T2 may extract webpage history information from the received sync data and may display the extracted webpage history information (S65). For example, the controller 180 may display the extracted webpage history information and then a webpage included in the received sync data. In this example, if one of a number of webpage items listed in the extracted webpage history information is selected, the controller 180 may display a webpage corresponding to the selected webpage item on the display module 151.

Alternatively, the controller 180 may display an icon corresponding to the extracted webpage history information on the display module 151. If a command to select the icon corresponding to the extracted webpage history information is received, the controller 180 may display the extracted webpage history information as a text list or using one or more tabs.

If one of the webpage items listed in the extracted webpage history information is selected, the controller 180 may determine whether a command to display a webpage corresponding to the selected webpage item has been issued (S70), and the controller may display the webpage corresponding to the selected webpage item on the display module 151 (S75).

The controller 180 may determine whether a command to display a webpage listed in the extracted webpage history information as having been accessed before or after a webpage corresponding to the selected webpage item has been issued (S80). If it is determined that a command to display the webpage listed in the extracted webpage history information as having been accessed before or the webpage accessed after the webpage corresponding to the selected webpage item has been issued, the controller 180 may display a webpage corresponding to the webpage listed in the extracted webpage history information as having been accessed before or the webpage accessed after the webpage corresponding to the selected webpage item (S85).

More specifically, if the display module 151 is a touch screen, the controller 180 may determine whether a webpage being currently displayed on the touch screen has been flicked. If the current webpage is determined to have been flicked, the controller 180 may determine that a command to display a webpage listed in the extracted webpage history information as having been accessed before or after the current webpage has been issued. More specifically, the controller 180 may decide whether to display the webpage listed in the extracted webpage history information as having been accessed before the current webpage or the webpage listed in the extracted webpage history information as having been accessed after the current webpage based on a direction in which the current webpage has been flicked. On the other hand, if the display module 151 is not a touch screen, the controller 180 may determine that a command to display the webpage listed in the extracted webpage history information as having been accessed before or the webpage accessed after the current webpage has been issued upon manipulation of a predetermined soft key or hard key.

The controller 180 may display the extracted webpage history information in such a manner that popup windows or webpages listed in the extracted webpage history information as having a low importance level can appear differently from other webpages listed in the extracted webpage history information. Examples of the webpages having a low importance level may include a login webpage and a webpage that has been visited by the user less than a predefined number of times. The controller 180 may mark the popup window or the webpage having a low importance level with a predetermined icon or may display the popup window or the webpage having a low importance level in a color different from other webpages listed in the extracted webpage history information.

The controller 180 may extract text information regarding a plurality of text strings that have been input to a webpage being currently displayed by the external terminal T2 from the received sync data. Thereafter, if the user inputs a text string onto a webpage being currently displayed on the display module 151, the controller 180 may determine whether there is a match for the input text string from among the text strings specified in the extracted text information. If there is a match for the input text string from among the text strings specified in the extracted text information, the controller 180 may execute an auto-complete function and may thus return one or more of the text strings specified in the extracted text information that match the input string. The user may easily input a search word into a search window, log on to a webpage, and/or input the address of a webpage without a need to completely type in any desired search word, ID and/or webpage address.

The controller 180 may also extract text information regarding a plurality of text strings that have been input to a webpage that has been displayed by the external terminal T2 from the received sync data. Thereafter, if the user inputs a text string onto a webpage being currently displayed on the display module 151, the controller 180 may determine whether there is a match for the input text string from among the text strings specified in the extracted text information. If there is a match for the input text string from among the text strings specified in the extracted text information, the controller 180 may execute an auto-complete function and may thus return one or more of the text strings specified in the extracted text information that match the input string.

Figure 8:
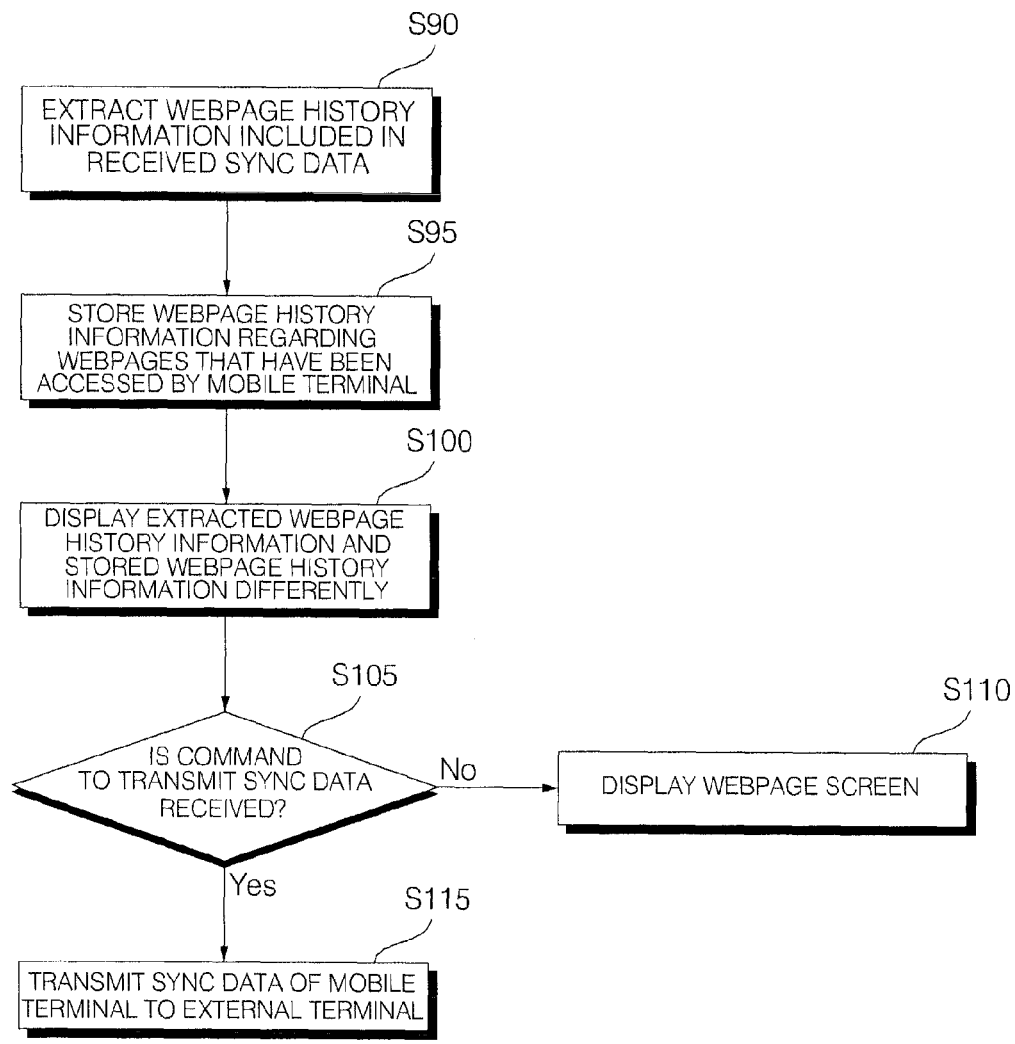

FIG. 8 illustrates a flowchart of an operating method of a mobile terminal according to an exemplary embodiment of the present invention. Other operations, orders of operations and embodiments may also be within the scope of the present invention. In this exemplary embodiment, the mobile terminal T1 may access webpages other than a plurality of webpages that have been displayed by the external terminal T2. The controller 180 may store webpage history information regarding a plurality of webpages that have been individually accessed by the mobile terminal T1. The controller 180 may display the webpages that have been individually accessed by the mobile terminal T1 differently from the webpages that have been displayed by the external terminal T2. For example, the controller 180 may display the webpages that have been individually accessed by the mobile terminal T1 and the webpages that have been displayed by the external terminal T2 differently using different colors and/or different tabs.

More specifically, as shown in FIG. 8, the controller 180 may extract webpage history information from sync data provided by the external terminal T2 (S90). Thereafter, the controller 180 may generate and store webpage history information regarding a plurality of webpages that have been individually accessed by the mobile terminal T1 (S95). The controller 180 may display both the extracted webpage history information and the generated webpage history information in such a manner that the webpages listed in the generated webpage history information can appear differently from a plurality of webpages listed in the extracted webpage history information (S100).

The user may transmit sync data from the mobile terminal T1 to the external terminal T2. The controller 180 may display an icon for transmitting sync data on the display module 180, and the controller 180 may determine whether the icon has been selected (S105). If the display module 151 is a touch screen, the controller 180 may determine, in operation S105, whether a command to transmit sync data is issued according to whether the icon is touched.

If the command to transmit sync data is determined to not have been issued, the controller 180 may display a webpage on the display module 151 (S110). The webpage displayed in operation S110 may correspond to one of the webpages listed in the generated webpage history information. Alternatively, the webpage displayed in operation S110 may correspond to one of the webpages listed in the extracted webpage history information.

On the other hand, if the command to transmit sync data is determined to have been issued, the controller 180 may transmit sync data of the mobile terminal T1 to the external terminal T2 in operation S115. The sync data of the mobile terminal 100 may include a webpage or a messenger currently being displayed on the display module 151, webpage history information of the mobile terminal 100, text information regarding a plurality of text strings that have been input to the webpage or the messenger and/or text information regarding a plurality of text strings that have been displayed on the messenger.

For example, the user may issue a command to transmit sync data to a personal computer (PC) while chatting using a messenger program. The controller 180 may then transmit sync data to the PC. The transmitted sync data may include a messenger being currently displayed on the display module 151, text displayed on the messenger, or at least one of a still image, a moving image and audio data being currently displayed or output in association with the messenger. The PC may display the same messenger as is being currently displayed on the display module 151 based on the sync data transmitted by the controller 180. As a result, the user may participate in a same chat session not only via the mobile terminal T1 but also via the PC.

Figure 9:
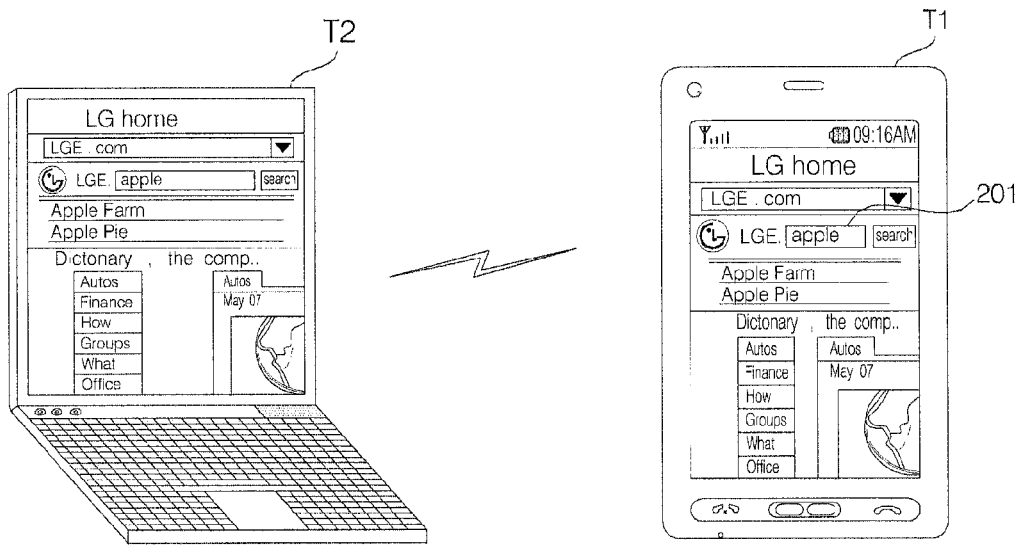
FIGS. 9 through 20 illustrate diagrams for explaining operating methods of a mobile terminal according to exemplary embodiments of the present invention.

FIG. 9 illustrates a diagram for explaining an operating method of a mobile terminal according to an exemplary embodiment of the present invention. Other embodiments and configurations may also be within the scope of embodiments of the present invention. As shown in FIG. 9, the mobile terminal T1 may receive sync data from the external terminal T2, and the mobile terminal T1 may display the same webpage as a webpage being currently displayed by the external terminal T2 on the display module 151 based on the received sync data.

More specifically, if the user inputs a command to transmit sync data to the external terminal T2, the external terminal T2 may transmit its sync data to the mobile terminal T1. The sync data transmitted by the external terminal T2 may include not only information regarding the webpage being currently displayed by the external terminal T2 but also text information 201 regarding a plurality of text strings that have been input to the webpage being currently displayed by the external terminal T2. Therefore, the controller 180 may display the same text on the display module 151 as that input to the webpage being currently displayed by the external terminal T2 (i.e., 'apple'), as shown in FIG. 9.

Figure 10:
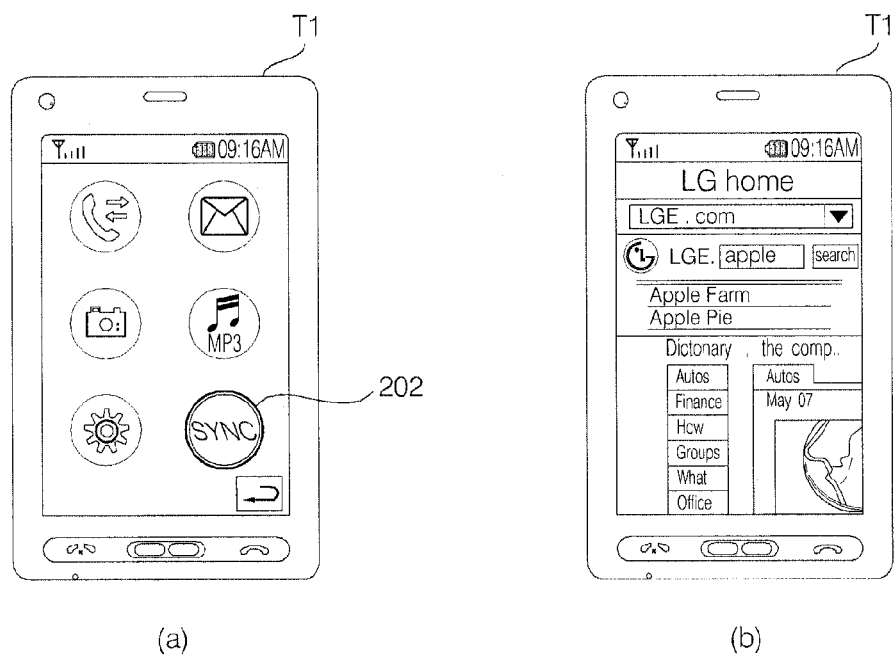

FIGS. 10(*a*) and 10(*b*) illustrate diagrams for explaining an operating method of a mobile terminal according to an exemplary embodiment of the present invention. Other embodiments and configurations may also be within the scope of the present invention. In this exemplary embodiment, the controller 180 may display an icon 202 corresponding to a webpage or a messenger included in sync data provided by the external terminal T2 on an idle screen, and the controller 180 may display the webpage or the messenger included in the sync data of the external terminal T2 if the icon 202 displayed on the idle screen is selected.

More specifically, as shown in FIG. 10(*a*), the controller 180 may display the icon 202 corresponding to a webpage transmitted by the external terminal T2 on the display module 151. The icon 202 may be a text-based image. Alternatively, the icon 202 may include information regarding the webpage transmitted by the external terminal T2.

As shown in FIG. 10(b), if the user selects the icon 202, the controller 180 may display a webpage corresponding to the icon 202 on the display module 151. The webpage corresponding to the icon 202 may be a webpage displayed by the external terminal T2 at a transmission time of the sync data of the external terminal T2. Alternatively, the webpage corresponding to the icon 202 may be a webpage selected by the user.

If the display module 151 is a touch screen, the controller 180 may determine whether the icon 202 is selected based on whether the icon 202 is touched. The controller 180 may delete the icon 202 from the idle screen after the display of the webpage corresponding to the icon 202.

Figure 11:
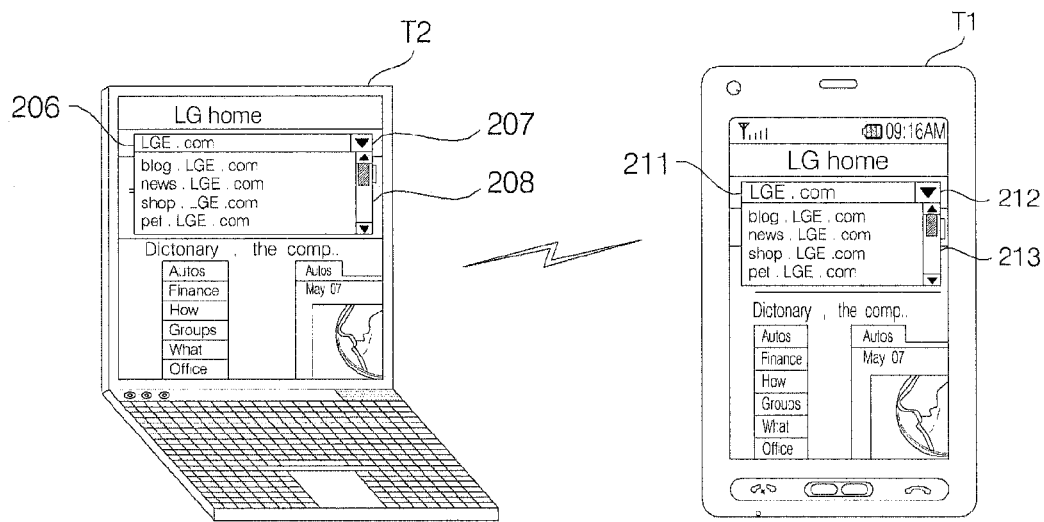

FIG. 11 illustrates a diagram for explaining an operating method of a mobile terminal according to an exemplary embodiment of the present invention. Other embodiments and configurations may also be within the scope of the present invention. In this exemplary embodiment, the external terminal T2 may transmit sync data including webpage history information to the mobile terminal T1. The webpage history information may include text information regarding a plurality of text strings that have been input to a webpage that has been or is being currently displayed by the external terminal T2.

As shown in FIG. 11, if a tab icon 207 in an address window 206 of a webpage displayed by the external terminal T2 is selected, a list of webpages that have been recently accessed by the external terminal T2 may be displayed in a webpage address list window 208. Sync data of the external terminal T2 may include addresses of the webpages that have been recently accessed by the external terminal T2.

Therefore, if the user selects a tab icon 212 in an address window 211 of a webpage displayed on the mobile terminal T1, the controller 180 may display the addresses of the webpages that have been recently accessed by the external terminal T2 in a list window 213. Thus, the user may easily identify the addresses of the webpages that have been recently accessed by the external terminal T2 from the list window 213.

Figure 12:
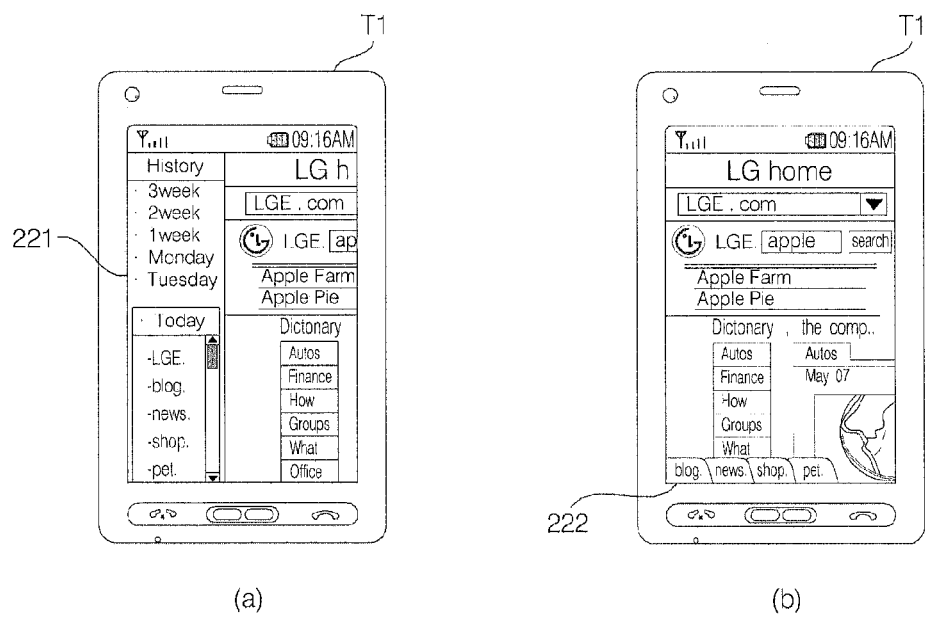

FIGS. 12(a) and 12(b) illustrate diagrams for explaining an operating method of a mobile terminal according to an exemplary embodiment of the present invention. Other embodiments and configurations may also be within the scope of the present invention. In this exemplary embodiment, the controller 180 may display webpage history information included in sync data provided by the external terminal T2 on the display module 151 as a text list or using one or more tabs. Thus, the user may easily identify a plurality of webpages that have been accessed by the external terminal T2 with the mobile terminal T1. In addition, the user may select and access one of the webpages listed in the webpage history information with the mobile terminal T1.

More specifically, as shown in FIG. 12(a), the controller 180 may display webpage history information included in sync data provided by the external terminal T2 on the display module 151 as a text window 221 in which a plurality of webpages that have been accessed by the external terminal T2 are arranged by date.

Alternatively, as shown in FIG. 12(b), the controller 180 may extract information regarding a number of webpages accessed on a particular date by the external terminal T2 from the webpage history information included in the sync data provided by the external terminal T2. The controller 180 may classify the webpages accessed on the particular date by the external terminal T2 into a plurality of categories and may display a plurality of tabs 222 respectively corresponding to the plurality of categories at a bottom of the display module 151.

If the user selects one of the webpages displayed in the text window 221 or one of the tabs 222, the controller 180 may display a webpage corresponding to the selected webpage or a webpage corresponding to the selected tab 222 on the display screen 151.

Figure 13:
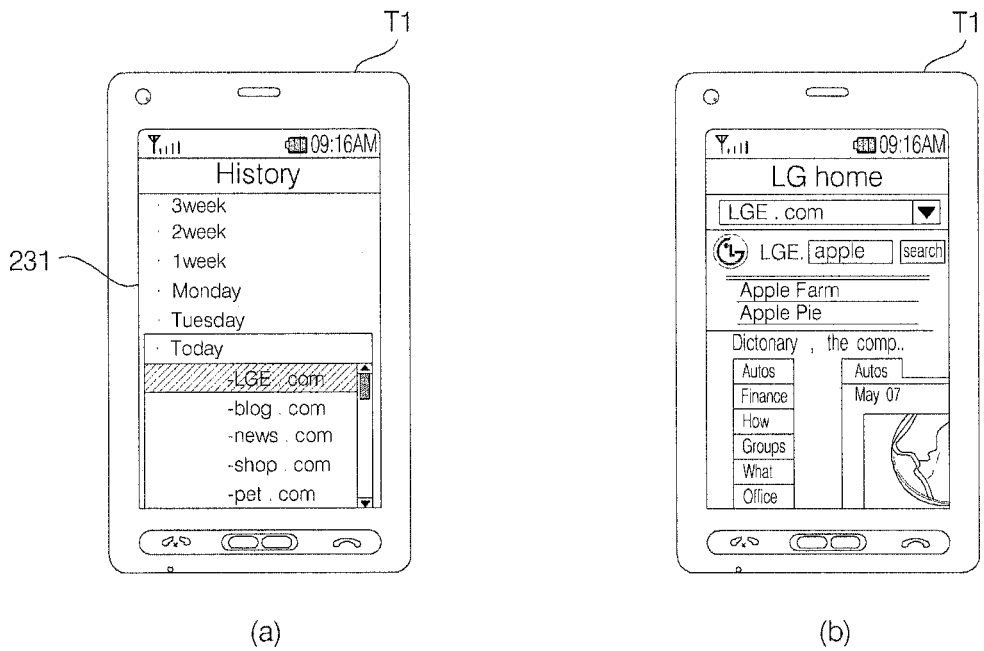

FIGS. 13(a) and 13(b) illustrate diagrams for an operating method of a mobile terminal according to an exemplary embodiment of the present invention. In this exemplary embodiment, the user may select one of a plurality of webpages listed in webpage history information of sync data provided by the external terminal T2 and may thus display a webpage corresponding to the selected webpage on the display module 151.

More specifically, as shown in FIG. 13(a), if a command to display webpage history information is received, the controller 180 may display webpage history information included in sync data provided by the external terminal T2 on the display module 151 as a text window 231. Alternatively, the controller 180 may display the webpage history information on the display module 151 using a plurality of tabs or icons.

The user may select one of a plurality of webpages displayed in the text window 231. As shown in FIG. 13(b), the controller 180 may then display a webpage corresponding to the selected webpage on the display module 151. If the display module 151 is a touch screen, the user may simply touch and thus select one of the webpages displayed in the text window 231. The controller 180 may determine that a command to display whichever of the webpages displayed in the text window 231 has been touched and thus selected by the user has been issued.

Figure 14:
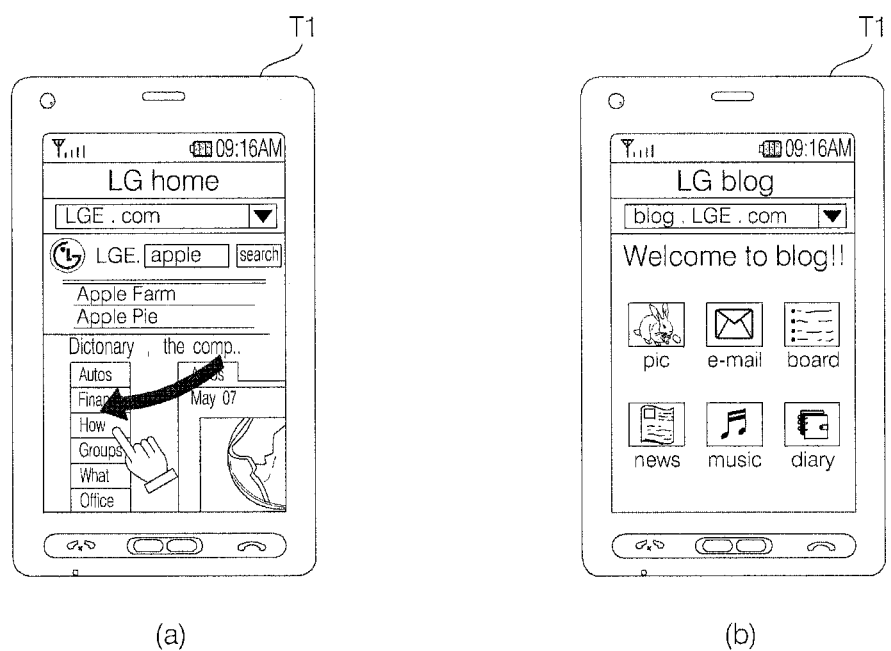

FIGS. 14(a) and 14(b) illustrate diagrams for explaining an operating method of a mobile terminal according to an exemplary embodiment of the present invention. Other embodiments and configurations may also be within the scope of embodiments of the present invention. In this exemplary embodiment, the user may input a command to display a webpage accessed before or a webpage accessed after a webpage currently being displayed on the display module 151. The controller 180 may acquire information regarding the webpage accessed before or the webpage accessed after the current webpage from webpage history information included in sync data provided by the external terminal T2 and may thus display the webpage accessed before or the webpage accessed after the current webpage in response to the command input by the user.

As shown in FIG. 14(a), if the display module 151 is a touch screen, the user may flick a webpage "LG Home" corresponding to an address 'LGE.com' displayed on the display module 151. The controller 180 may determine that a command to display a webpage accessed before or a webpage accessed after the webpage "LG Home" has been issued.

More specifically, if the user flicks the webpage "LG Home" from the right to the left, the controller 180 may display the webpage accessed after the webpage "LG Home" (i.e., a webpage 'LG Blog' corresponding to an address 'blog.LGE.com') on the display module 151, as shown in FIG. 14(b).

On the other hand, if the user flicks the webpage "LG Home" from the left to the right, the controller 180 may display the webpage accessed before the webpage "LG Home" on the display module 151.

FIG. 15(a) illustrates a diagram for explaining an operating method of a mobile terminal according to an exemplary embodiment of the present invention. Other embodiments and configurations may also be within the scope of the present invention. In this exemplary embodiment, the controller 180 may display webpage history information as text on the display module 151. The webpage history information displayed on the display module 151 may include first webpage history information specifying a plurality of webpages that have been displayed by the external terminal T2 and second webpage history information specifying a plurality of webpages that have been individually accessed by the mobile terminal 100. The controller 180 may differently display the first webpage history information and the second webpage history information so as to be distinguishable from each other.

Figure 15:
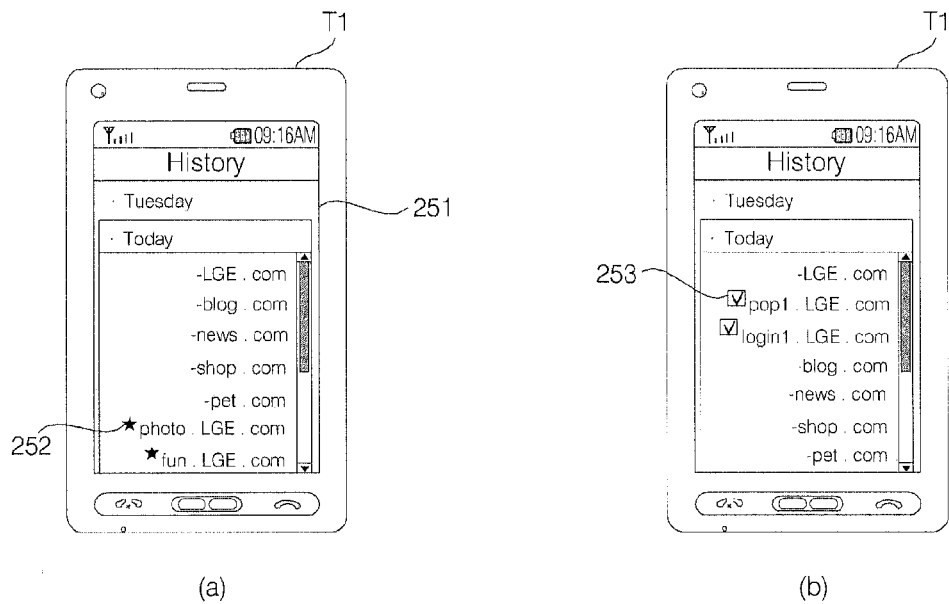

More specifically, as shown in FIG. 15(*a*), the controller 180 may display webpage history information in a text window 251 by individually marking each of a plurality of webpages that have been accessed by the mobile terminal 100 with an icon 252. Thus, the user may easily identify the webpages that have been individually accessed by the mobile terminal 100 from the text window 251.

FIG. 15(*b*) illustrates a diagram for explaining an operating method of a mobile terminal according to an exemplary embodiment of the present invention. Other embodiments and configurations may also be within the scope of the present invention. In this exemplary embodiment, the controller 180 may display webpage history information by marking a popup window or a webpage having a low importance level with an icon 253. Examples of the webpage having a low importance level may include a login webpage and/or a webpage that has been visited less than a predefined number of times by the user and/or only for a short time.

Thus, the user may easily identify a popup window or a webpage having a low importance level from webpage history information.

Figure 16:
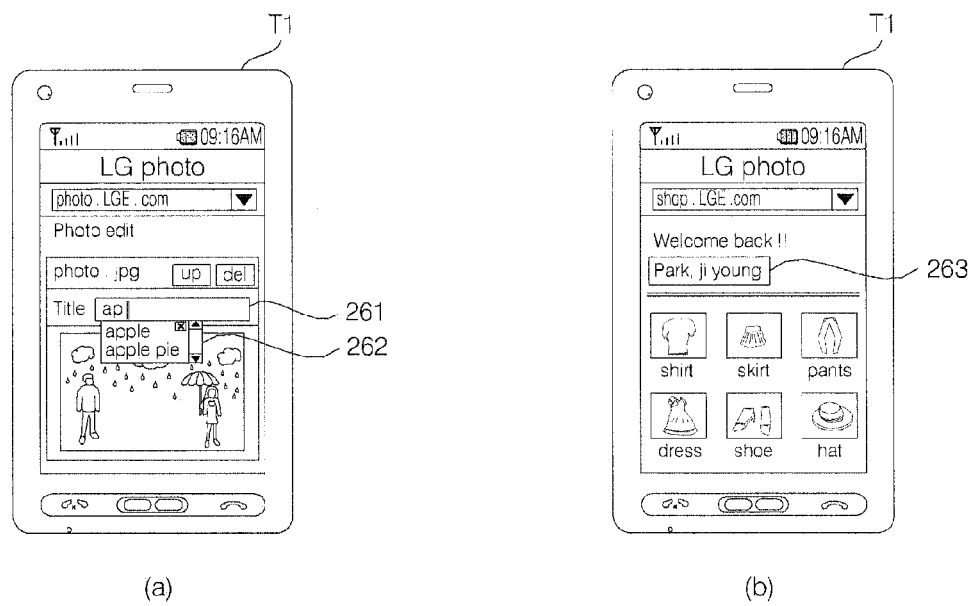

FIG. 16(*a*) illustrates a diagram for explaining an operating method of a mobile terminal according to an exemplary embodiment of the present invention. Other embodiments and configurations may also be within the scope of the present invention. In this exemplary embodiment, the controller 180 may execute a text auto-complete function based on text information included in sync data. The text information may include text information regarding a plurality of text strings that have been input to a webpage or a messenger that has been or is being currently displayed by the external terminal T2 or text information regarding a plurality of text strings that have been displayed on the messenger.

More specifically, as shown in FIG. 16(*a*), when a webpage corresponding to a webpage address 'photo.LGE.com' is displayed on the display module 151, the user may input in a title input window 261 a title of a photo to be uploaded. When the user inputs a text string (i.e., 'ap') into the title input window 261, the controller 180 may determine whether there is a match for the input text string from among a plurality of text strings that have been input to a webpage that has been or is being currently displayed on the external terminal T2. If there is a match for the input text string from among the text strings that have been input to the webpage that has been or is being currently displayed on the external terminal T2, the controller 180 may execute the text auto-complete function, and may display a list window 262 in which one or more text strings that match the input text string are displayed. The user may then select one of the text strings displayed in the list window 262, and may thus complete the input text string.

FIG. 16(*b*) illustrates a diagram for explaining an operating method of a mobile terminal according to an exemplary embodiment of the present invention. Other embodiments and configurations may also be within the scope of the present invention. In this exemplary embodiment, if the user completes logging on to a website via the external terminal T2, the controller 180 may display a resulting webpage on the display module 151.

More specifically, as shown in FIG. 16(*b*), if the user is successfully logged on to a website corresponding to an address 'shop.LGE.com' via the external terminal T2, the controller 180 may display a resulting webpage on the display module 151. In this case, the user's identifier (ID) may be displayed in an ID display window 263 of the webpage displayed on the display module 151. Hence the user of the mobile terminal T1 need not login after the webpage of the website corresponding to an address 'shop.LGE.com' is displayed on the display module 151.

Figure 17:
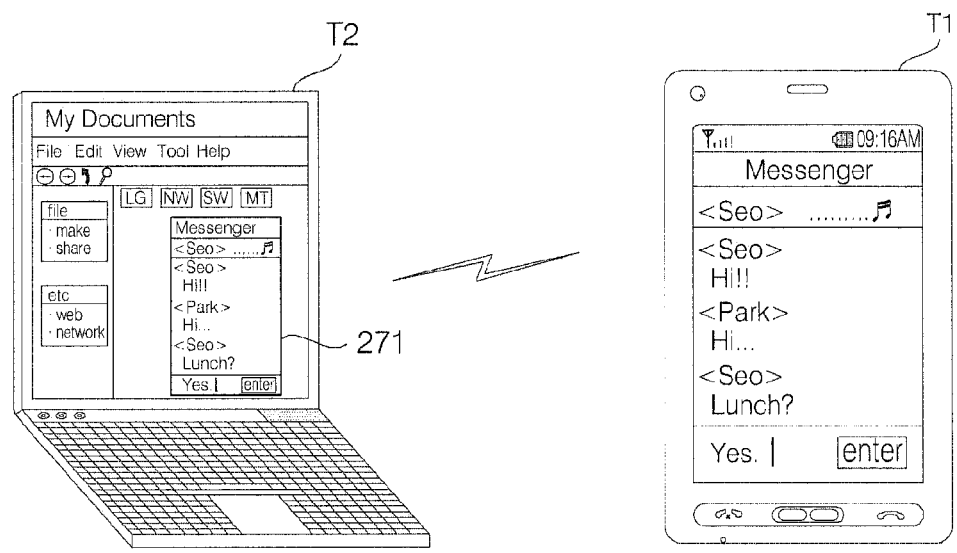

FIG. 17 illustrates diagrams for explaining an operating method of a mobile terminal according to an exemplary embodiment of the present invention. Other embodiments and configurations may also be within the scope of the present invention. In this exemplary embodiment, the controller 180 may display on the display module 151 a same messenger as that displayed on the external terminal T2 while maintaining the login state of the user. Thus, the user may participate in a same chat session not only via the external terminal T2 but also via the mobile terminal T1. In this case, as shown in FIG. 17, a text string 'Yes' typed in a message input window 271 of the messenger displayed by the external terminal T2 may also be displayed on the display module 151.

Figure 18:
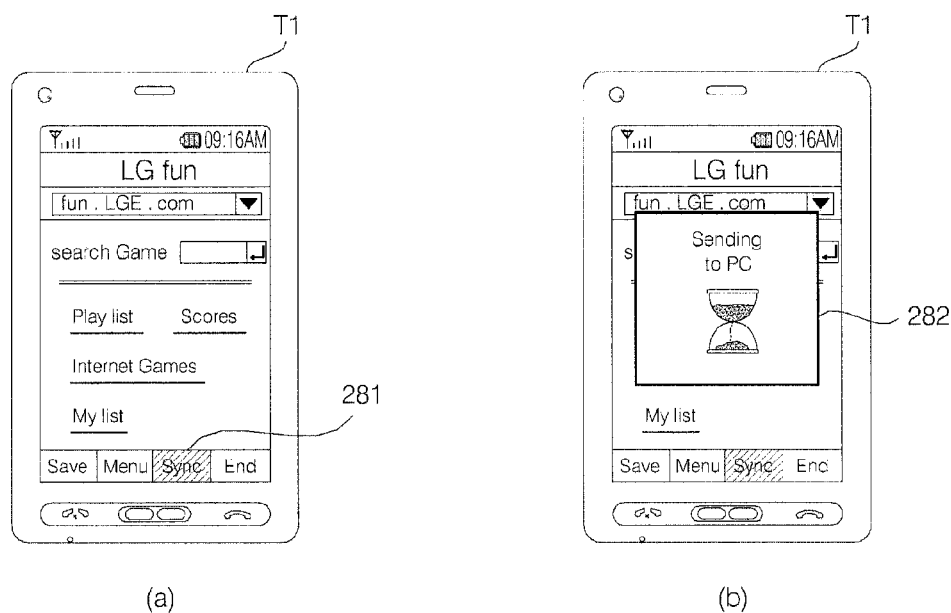

FIGS. 18(*a*) and 18(*b*) illustrate diagrams for explaining an operating method of a mobile terminal according to an exemplary embodiment of the present invention. Other embodiments and configurations may also be within the scope of the present invention.

More specifically, FIG. 18(*a*) illustrates a screen displayed on the display module 151 when the user transmits sync data of the mobile terminal T1 to an external terminal. As shown in FIG. 18(*a*), the controller 180 may display a soft key 281 for sending sync data at a bottom of the display module 151. If the user selects the soft key 281, the controller 180 may transmit sync data of the mobile terminal T1 to an external terminal. The user may specify in advance the types of external terminals to which the sync data of the mobile terminal T1 can be transmitted. Alternatively, the controller 180 may transmit the sync data of the mobile terminal T1 to a number of external terminals connected to the mobile terminal 100 via USBs or using various wireless communication methods. Alternatively, the controller 180 may transmit the sync data of the mobile terminal T1 to a web server on the internet.

The sync data of the mobile terminal T1 may include at least one of information regarding a webpage, a messenger, an email and/or a word-processor screen being currently displayed on the display module 151, webpage history information present in the mobile terminal 100 (including webpage history provided by the external terminal T2) and text information regarding a plurality of text strings that have been input to the webpage, the messenger, the email, and/or the word-processor screen. The user may choose which of a webpage being currently displayed on the display module 151 and a webpage previously displayed on the display module 151 to be included in the sync data of the mobile terminal T1.

As shown in FIG. 18(*b*), the controller 180 may display a popup window 282 indicating whether the sync data of the mobile terminal T1 is being transmitted to an external terminal.

Figure 19:
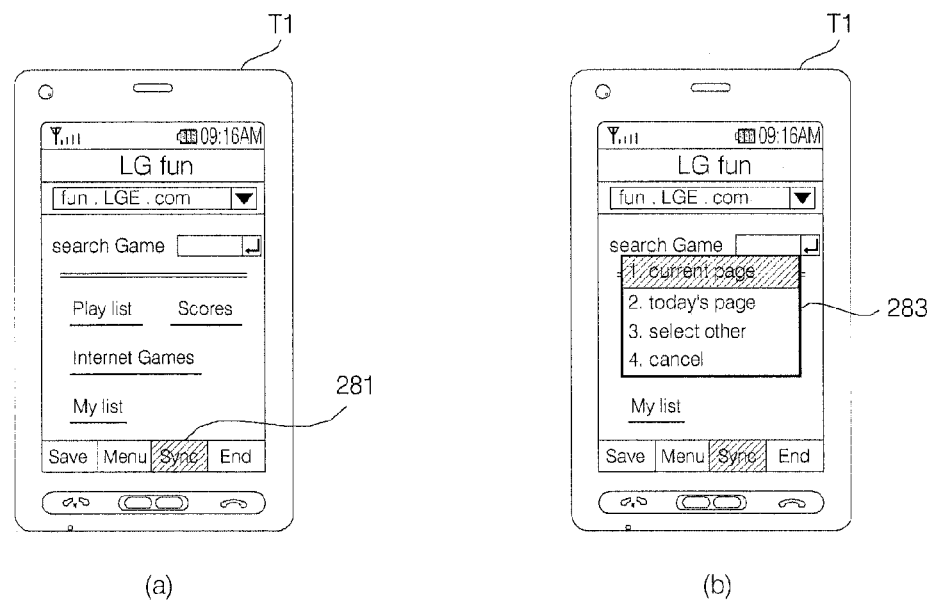

FIGS. 19(*a*) and 19(*b*) illustrate diagrams for explaining an operating method of a mobile terminal according to an exemplary embodiment of the present invention. Other embodiments and configurations may also be within the scope of the present invention. In this exemplary embodiment, the user may select a webpage to be included in sync data to be transmitted to an external terminal. The controller 180 may transmit information regarding a web browser having the selected webpage to the external terminal.

More specifically and as shown in FIG. 19(*a*), the user may manipulate a soft key 281 for sending sync data. As shown in FIG. 19(*b*), if the user manipulates the soft key 281 and thus issues a command to transmit sync data of the mobile terminal T1, the controller 180 may display a webpage selection window 283 for selecting a webpage to be transmitted on the display module 151 and may thus allow the user to select a webpage to be transmitted to an external terminal from the webpage selection window 283.

Figure 20:
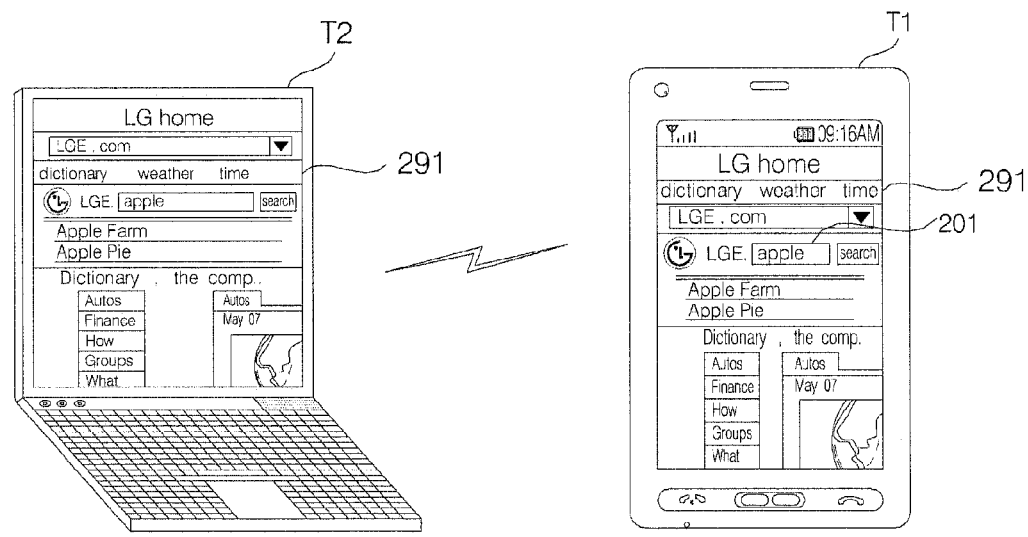

FIG. 20 illustrates a diagram for explaining an operating method of a mobile terminal according to an exemplary embodiment of the present invention. Other embodiments and configurations may also be within the scope of the present invention. In this exemplary embodiment, a UI may be set in a web browser displayed by the external terminal T2 so as to display a toolbar in the web browser. Sync data of the external terminal T2 may include information regarding the web browser and information regarding the UI.

More specifically and as shown in FIG. 20, the controller 180 may display a web browser including a toolbar 291 based on sync data provided by the external terminal T2. Thus, the user may use the web browser in a same web environment as the external terminal T2.

Figure 21:
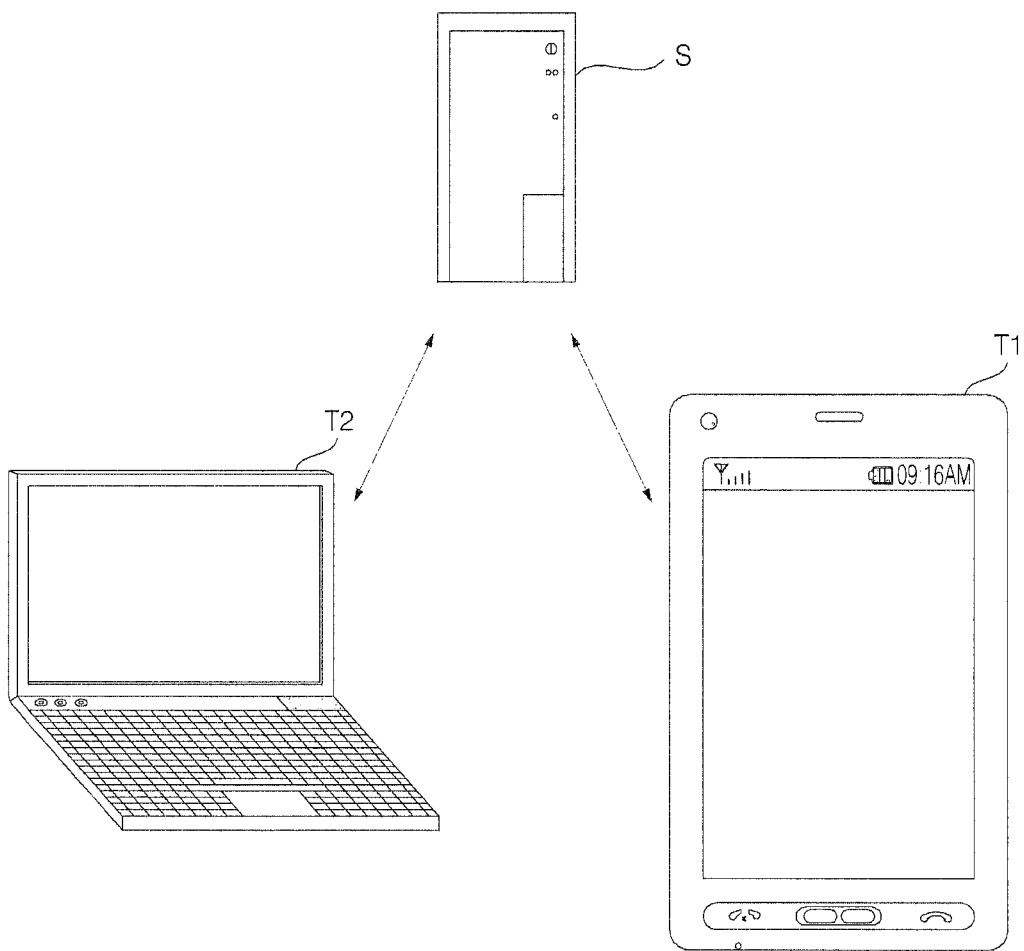
FIG. 21 illustrates a terminal sync system according to an exemplary embodiment of the present invention.

FIG. 21 illustrates a diagram of a terminal sync system according to an exemplary embodiment of the present invention. Other embodiments and configurations may also be within the scope of the present invention. As shown in FIG. 21, the external terminal T2 may transmit sync data to the mobile terminal T1 via a server S. In addition, the mobile terminal T1 may transmit sync data to the external terminal T2 via the server S. The external terminal T2 and the mobile terminal T1 may be coupled to the server S via various networks such as a wired/wireless Internet.

The server S may be a web server established to transmit or receive data on the Web. The external terminal T2 may transmit its sync data to the server S when a command to transmit sync data is received. The sync data of the external terminal T2 may include information specifying a mobile terminal with which the external terminal T2 is to be synchronized. Thus, the server S may transmit the sync data of the external terminal T2 to the mobile terminal T1 specified in the sync data of the external terminal T2. Alternatively, the sync data of the external terminal T2 may be stored in the server S along with a predetermined ID. The mobile terminal T1 may then access and download the sync data stored in the server S with reference to the predetermined ID. Thereafter, the mobile terminal T1 may display a browser on the display module 151 with reference to browser information included in the downloaded sync data. Likewise, the mobile terminal T1 may transmit its sync data to the external terminal T2 via the server S when a command to transmit sync data is received.

In the exemplary embodiment of FIG. 21, the user may transmit sync data of the external terminal T2 while using a webpage or messenger displayed by the external terminal T2, and may thus view the same webpage or messenger not only via the external terminal T2 but also via the mobile terminal T1. In addition, the user may transmit sync data of the mobile terminal T1 when using a webpage or a messenger displayed on the display module 151, and may thus continue to view the same webpage or messenger not only via the external terminal T2 but also via the mobile terminal T1.

Embodiments of the present invention may be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium may include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing embodiments of the present invention may be easily construed by one of ordinary skill in the art.

Embodiments of the present invention may provide a mobile terminal capable of being coupled to an external terminal either wirelessly or by wire and displaying a same webpage or messenger as that displayed by the external terminal. Thus, webpage history information and messenger content information of the external terminal may be identified from the mobile terminal. In addition, since information regarding a webpage or a messenger displayed by the mobile terminal can be transmitted to the external terminal, the mobile terminal and the external terminal may be easily synchronized using a simple intuitive UI.

Embodiments of the present invention may provide a mobile terminal that can be coupled to an external terminal and can thus display a webpage or a messenger displayed by an external terminal so the webpage or the messenger may be easily recognizable by a user.

Embodiments of the present invention may also provide a mobile terminal equipped with a user interface (UI) capable of allowing the mobile terminal to be easily synchronized with an external terminal and an operating method of the mobile terminal.

An operating method of a mobile terminal may include receiving sync data including information regarding a webpage, a messenger, an email and/or a word-processor screen being currently displayed by an external terminal, and displaying the same webpage, the same messenger, the same email or the same word-processor screen as that being currently displayed by the external terminal on a display module based on the received sync data.

A mobile terminal may include a display module, a wireless communication unit configured to receive sync data including information regarding a webpage, a messenger, an email and/or a word-processor screen being currently displayed by an external terminal, and a controller configured to display the same webpage, the same messenger, the same email or the same word-processor screen as that being currently displayed by the external terminal on the display module based on the received sync data.

A terminal sync system may include a first terminal configured to display a webpage, a messenger, an email and/or a word-processor screen, a server configured to receive sync data including information regarding the webpage, the messenger, the email and/or the word-processor screen displayed by the first terminal, and a second terminal configured to display the same webpage, the same messenger, the same email and/or the same word-processor screen as that displayed by the first terminal based on the sync data.

A computer-readable recording medium may be provided having recorded thereon a program for executing an operating method of a mobile terminal. The operating method may include receiving sync data including information regarding a webpage, a messenger, an email and/or a word-processor screen being currently displayed by an external terminal, and displaying the same webpage, the same messenger, the same email or the same word-processor screen as being currently displayed by the external terminal on a display module based on the received sync data.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An operating method of a mobile terminal, the operating method comprising:
   receiving, at the mobile terminal, sync data including information regarding a webpage or a messenger being displayed by an external terminal, the received sync data further including text information that was input to the webpage or the messenger at the external terminal;
   displaying, on a display module while maintaining a login state of a user of the external terminal, the webpage or the messenger as is displayed by the external terminal based on the received sync data, and the display module further displaying the text information that was input to the webpage or the messenger;
   displaying, on the display module, an icon corresponding to the webpage or the messenger included in the sync data provided by the external terminal, wherein the displaying includes displaying the webpage or the messenger on the display module in response to receipt of a command to select the icon; and
   removing the icon displayed on the display module after a user selects the icon and an application corresponding to the icon is executed.

2. The operating method of claim 1, wherein the sync data includes user interface (UI) information regarding a UI set in the webpage or the messenger being displayed by the external terminal,
   wherein the webpage or the messenger displayed on the display module based on the received sync data is a webpage or a messenger corresponding to the UI information.

3. The operating method of claim 1, wherein the icon includes an image or a number of characters included in the webpage or the messenger.

4. The operating method of claim 1, further comprising:
   extracting, from the received sync data, webpage history information regarding a plurality of webpages that have been displayed by the external terminal; and
   displaying the webpage history information on the display module.

5. The operating method of claim 4, wherein displaying the webpage history information comprises displaying the webpage history information as a text list or using a number of tabs.

6. The operating method of claim 4, wherein displaying the webpage history information comprises displaying the webpage history information such that a popup window or a webpage having a low importance level is differentiated from other windows or webpages.

7. The operating method of claim 4, wherein the webpage history information includes at least one of information specifying a plurality of webpages displayed by the external terminal during a predetermined period of time or information specifying a plurality of webpages displayed by the external terminal on each date.

8. The operating method of claim 4, further comprising:
   receiving a command to display one of the webpages listed in the webpage history information, and
   displaying the corresponding webpage on the display module in response to receiving the command.

9. The operating method of claim 8, wherein when the display module is a touch screen, displaying the corresponding webpage comprises displaying the webpage listed in the webpage history information that has been touched.

10. The operating method of claim 8, further comprising, after displaying the corresponding webpage:
    when the display module is a touch screen, determining whether a webpage displayed on the touch screen has been flicked; and
    when the webpage displayed on the touch screen is determined to have been flicked, displaying a webpage listed in the webpage history information as having been accessed before the flicked webpage or displaying a webpage listed in the webpage history information as having been accessed after the flicked webpage on the touch screen.

11. The operating method of claim 1, further comprising:
    extracting, from the received sync data, webpage history information regarding a plurality of webpages displayed by the external terminal;
    storing webpage history info nation regarding a plurality of webpages that have been accessed by the mobile terminal; and
    displaying the extracted webpage history information and the stored webpage history information differently on the display module so as to be distinguishable from each other.

12. The operating method of claim 1, wherein the sync data includes the text information regarding a plurality of text strings input to the webpage or the messenger displayed by the external terminal, and the method further comprises:
    extracting the text information from the received sync data; and
    when there is a match for a text string input to the webpage, the messenger, the email or the word-processor screen displayed on the display module from among the text strings specified in the extracted text information, executing a text auto-complete function.

13. The operating method of claim 1, further comprising:
    determining whether a command to transmit sync data has been received; and when the command to transmit sync data is determined to have been received, transmitting sync data to an external terminal, the transmitted sync data including at least one of:
  information regarding a webpage or a messenger being displayed on the display module,
  text information regarding a plurality of text strings that have been input to a webpage or a messenger, and
  webpage history information regarding a plurality of webpages that have been displayed on the display module.

14. The operating method of claim 13, further comprising displaying, on the display module, an icon for issuing the command to transmit sync data,
  wherein the determining comprises determining that the command to transmit sync data has been received when the icon has been selected.

15. The operating method of claim 13, further comprising determining whether a command to select a screen to be transmitted to the external terminal has been received,
  wherein the transmitting comprises transmitting the sync data including information regarding the screen selected to be transmitted to the external terminal when the command to select a screen to be transmitted to the external terminal is determined to have been received.

16. The operating method of claim 1, further comprising performing an auto-complete function.

17. A mobile terminal comprising:
  a display module;
  a wireless communication unit to receive sync data including information regarding a webpage or a messenger being displayed by an external terminal, the received sync data further including text information that was input to the webpage or the messenger at the external terminal; and
  a controller to display, on the display module while maintaining a login state of a user at the external device, the webpage or the messenger as is displayed by the external terminal based on the received sync data, and the display module further displaying the text information that was input to the webpage or the messenger, wherein the controller displays, on the display module, an icon corresponding to the webpage or the messenger included in the sync data provided by the external terminal, and the controller displays the webpage or the messenger in response to receipt of a command to select the icon, and wherein the controller removes the icon displayed on the display module after a user selects the icon and an application corresponding to the icon is executed.

18. The mobile terminal of claim 17, wherein the sync data includes user information (UI) information regarding a UI set in the webpage or the messenger being displayed by the external terminal,
  wherein the webpage or the messenger displayed on the display module is a webpage or a messenger corresponding to the UI information.

19. The mobile terminal of claim 17, wherein the controller extracts, from the received sync data, webpage history information regarding a plurality of webpages that have been displayed by the external terminal, and the controller displays the webpage history information on the display module.

20. The mobile terminal of claim 19, wherein the mobile terminal receives a command to display one of the webpages listed in the webpage history information, and the controller displays the corresponding webpage on the display module in response to receiving the command.

21. The mobile terminal of claim 17, wherein the controller extracts, from the received sync data, webpage history information regarding a plurality of webpages displayed by the external terminal, and webpage history information regarding a plurality of webpages that have been accessed by the mobile terminal is stored, and the controller displays the extracted webpage history information and the stored webpage history information differently on the display module so as to be distinguishable from each other.

22. The mobile terminal of claim 17, wherein the sync data includes the text information regarding a plurality of text strings input to a webpage or a messenger displayed by the external terminal, and the controller extracts the text informiation from the received sync data, and when there is a match for a text string input to the webpage or the messenger displayed on the display module from among the text strings specified in the extracted text information, the controller executes a text auto-complete function.

23. The mobile terminal of claim 17, wherein the controller determines whether a command to transmit sync data has been received, and when the command to transmit sync data is determined to have been received, sync data is transmitted to an external terminal, the transmitted sync data including at least one of:
  information regarding a webpage or a messenger being displayed on the display module,
  text information regarding a plurality of text strings that have been input to a webpage or a messenger displayed on the display module, and
  webpage history information regarding a plurality of webpages that have been displayed on the display module.

24. The mobile terminal of claim 17, wherein the controller further performs an auto-complete function.

25. A terminal sync system comprising:
  a first terminal to display a webpage or a messenger;
  a server to receive sync data including information regarding the webpage or the messenger displayed by the first terminal, the received sync data further including text information that was input to the webpage or the messenger at the external terminal; and
  a second terminal to display, while maintaining a login state of a user at the external terminal, the webpage or the messenger as is displayed by the first terminal based on the sync data, and the second terminal to further display the text information that was input to the webpage or the messenger, wherein the second terminal to display an icon corresponding to the webpage or the messenger included in the sync data provided by the external terminal, wherein the webpage or the messenger is displayed on the second terminal in response to receipt of a command to select the icon, and the displayed icon is removed after a user selects the icon and an application corresponding to the icon is executed.

* * * * *